United States Patent
Ku

(10) Patent No.: US 8,861,511 B2
(45) Date of Patent: *Oct. 14, 2014

(54) CONVERGED TELEPHONE NUMBER MAPPING FOR CALL COMPLETION AMONG HYBRID COMMUNICATION SERVICES

(75) Inventor: Barnard Ku, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 115 days.

This patent is subject to a terminal disclaimer.

(21) Appl. No.: 13/555,716

(22) Filed: Jul. 23, 2012

(65) Prior Publication Data

US 2012/0287857 A1    Nov. 15, 2012

Related U.S. Application Data

(63) Continuation of application No. 12/481,128, filed on Jun. 9, 2009, now Pat. No. 8,249,056.

(60) Provisional application No. 61/159,703, filed on Mar. 12, 2009.

(51) Int. Cl.
*H04L 12/66* (2006.01)
*H04M 7/12* (2006.01)
*H04L 29/12* (2006.01)

(52) U.S. Cl.
CPC .............. *H04M 7/123* (2013.01); *H04M 7/128* (2013.01); *H04L 29/12896* (2013.01); *H04L 61/605* (2013.01); *H04L 29/1216* (2013.01); *H04L 61/157* (2013.01)
USPC ...................................... 370/352; 379/220.01

(58) Field of Classification Search
CPC ........................... H04L 29/1216; H04M 7/123

USPC ...................................... 370/252; 379/220.01
See application file for complete search history.

(56) References Cited

U.S. PATENT DOCUMENTS

2005/0286531 A1    12/2005    Tuohino et al.
2006/0029043 A1    2/2006    Nishida et al.

(Continued)

OTHER PUBLICATIONS

Office Action dated Jan. 24, 2012 for U.S. Appl. No. 12/481,128, 18 pages.

(Continued)

*Primary Examiner* — Creighton Smith
(74) *Attorney, Agent, or Firm* — Amin, Turocy & Watson, LLP

(57) ABSTRACT

System(s) and method(s) are provided for enabling routing and call completion among hybrid communication services. A client component receives a request to establish a call session, the request includes a service identifier tag that uniquely discloses a requested communication service. Client component validates the tag, and generates a query that is conveyed to a server, which supplies a set of Naming Authority Pointer (NAPTR) resource records (RRs) in response to query. The client component receives the set of NAPTR RRs; validates received Telephone Number Mapping (ENUM) embedded service and protocol identifiers associated with the NAPTR RRs; and associates the received tag with a matching NAPTR RR to route the call session and complete the call. Configurable logic that dictates association of the service identifier tag with a NAPTR RR also can enable routing and call completion when the tag is unavailable. A device that exploits service identifier tag is provided.

20 Claims, 15 Drawing Sheets

(56) References Cited

U.S. PATENT DOCUMENTS

| | | |
|---|---|---|
| 2006/0083222 A1 | 4/2006 | Miyajima et al. |
| 2006/0262917 A1 | 11/2006 | Marsico |
| 2008/0101582 A1 | 5/2008 | Hua et al. |
| 2009/0161854 A1 | 6/2009 | Ku et al. |
| 2010/0149995 A1 | 6/2010 | Khan et al. |
| 2010/0150143 A1 | 6/2010 | Ku |
| 2010/0205268 A1 | 8/2010 | Zhu et al. |
| 2011/0149956 A1 | 6/2011 | Alt et al. |
| 2012/0076292 A1 | 3/2012 | Schultz et al. |

OTHER PUBLICATIONS

Office Action dated May 21, 2012 for U.S. Appl. No. 12/467,573, 21 pages.

Office Action dated Apr. 30, 2014 for U.S. Appl. No. 13/908,691, 10 pages.

CONVERGED TELEPHONE NUMBER MAPPING FOR CALL COMPLETION AMONG HYBRID COMMUNICATION SERVICES

CROSS REFERENCE TO RELATED APPLICATION

This application is a continuation of U.S. application Ser. No. 12/481,128, filed on Jun. 9, 2009, and entitled "CONVERGED TELEPHONE NUMBER MAPPING FOR CALL COMPLETION AMONG HYBRID COMMUNICATION SERVICES," which claims the benefit of U.S. Provisional Application No. 61/159,703, filed on Mar. 12, 2009, and entitled "CONVERGED TELEPHONE NUMBER MAPPING FOR CALL COMPLETION AMONG CIRCUIT-SWITCHED VOICE AND PACKET-SWITCHED SERVICES." The entireties of each of these applications is incorporated herein by reference.

TECHNICAL FIELD

The subject innovation relates to wireless communications and, more particularly, to correction of propagation delay of wireless signals. This invention relates generally to communication networks and, more specifically, to enabling call completion among hybrid communication services such as circuit-switched voice services and packet-based services in an internet protocol (IP)-based network, such as for example an IP Multimedia Subsystem network, or any packet-based network.

BACKGROUND

To retain current customers and add new service accounts, mobile network operators exploit new technologies and put forward associated new services. Yet, investment cycle from network deployment, product rollout, and revenue collection is substantially long (e.g., 3-5 years). In addition, deployment of mobile networks based on new technologies and associated services significantly erode legacy network deployments (e.g., land-line telephony, digital cellular networks, etc.) and associated investment, much of which is substantive not only in connection with deployment but also with maintenance and operation. Therefore, migration towards advanced network technologies and rich, complex communication services proceeds at slower pace than often planned.

To preserve investments on legacy networks and exploit packet-based (e.g., internet protocol (IP)-based) communication services, telephone number mapping (ENUM) provides a technological framework that unifies telephone numbers within E.164 standard with IP-based domain names. Such unification allows a telephone number assigned to a telephone that operates in any network technology, including legacy networks, to be resolved to an internet address and thus be exposed to IP-based services (e.g., voice over IP (VoIP), IP multimedia services, etc.). Yet, ENUM platforms typically are dedicated to conversion of telephone numbers into an internet address related with a dedicated service, even though network operators generally develop suites of services directed to multiple customer segments in order to preserve and gain market share. Converged ENUM platforms have been exploited marginally thus far.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject innovation provides system(s) and method(s) for enabling routing and call completion amongst a circuit switched voice call and a packet-based service in a packet-based network, such as an IP-based network of which IP Multimedia Subsystem (IMS) network is an example; a VoIP network also is an example of the IP-based network. In an aspect, a system for routing and call completion includes an ENUM client component, e.g., a serving call session control function (S-CSCF) component, an interrogating call session control function (I-CSCF) component or, a transit function component, that receives an INVITE request to establish a call session, wherein the INVITE request includes an IMS Communication Service Identifier (ICSI) tag or substantially any other tag that identifies a communications service that is requested. The ENUM client component extracts the ICSI tag and generates an ENUM query that is conveyed to an ENUM server that resolves the ENUM query and delivers a set of Naming Authority Pointer (NAPTR) resource records. The set of NAPTR resource records are resolved from a records storage that includes one or more records associated with disparate services for a set of subscribers. The ENUM client component receives the set of NAPTR records, conducts an integrity check to validate received ENUM service resolution service and protocol identifiers, and associates the received ICSI tag with the one or more of the received NAPTR resource records in order to route the requested call session and complete the call. ICSI tag or substantially any or any service identifier tag includes at least one service field attribute (SFA), or service attribute, that uniquely determines a type of service that is associated with ENUM service identifier. For example, ICSI tag service field attributes include "Null", "Voice", "VideoShare", and so forth. In an aspect, one or more ENUM identifiers for ENUM services are generated in the subject innovation such as "E2U+videomsg:sip", the ENUM identifiers can be mapped one-to-one to ICSI tag service field attributes.

In an aspect of the subject innovation, the ENUM client component receives logic, embodied in a set of code instructions, for example, to associate an ICSI tag with one or more NAPTR records, or to validate an ICSI tag. The logic is configurable and upgradable or extensible, and can be implemented by a system that can reside within one or more network components, e.g., control layer components, within an IMS platform or any IP-based or packet-based network, or a network or platform external and functionally coupled thereto. In addition, the ENUM client component can receive configurable logic that establishes a procedure for routing and completing a call when the ICSI tag is absent; e.g., the ICSI tag is not extracted by a query component that resides in the ENUM client component, or an extracted ICSI tag has an erroneous value.

It is noted that aspects and features of the subject innovation allow for completion of hybrid calls based on services that operate with disparate communication technology, e.g., circuit-switched (CS) voice call and packet-switched (PS) data call such as calls associated with a video exchange IP-based service. Accordingly, a subscriber of VoIP services, e.g., a consumer subscriber or a business subscriber, can successfully effect a call to subscribers that utilize CS voice network. A converged ENUM solution in which a single ENUM client component and a single ENUM server functionally coupled to a record storage that includes a plurality of NAPTR records for each provisioned E.164 telephone number within a service provider network can enable call completion of the hybrid calls as described herein.

In another aspect, the subject innovation provides a device that can exploit a service identifier tag that includes a set of one or more service field attributes which uniquely identify respective communication services. Based at least in part on the set of service field attributes and a service policy, the device can select, initiate, or launch one or more applications that supply at least part of the communication services identified by the set of one or more service field attributes. In addition, the device can select on or more communication protocols to enable delivery of data and signaling associated with the one or more identified communication services.

Aspects, features, or advantages of the subject innovation can be exploited in substantially any, or any, wireless telecommunication or radio technology or network combined with a platform for packet-based services. Non-limiting examples of such technologies or networks include Femtocell technology, Wi-Fi, Worldwide Interoperability for Microwave Access (WiMAX); Enhanced General Packet Radio Service (Enhanced GPRS); Third Generation Partnership Project (3GPP) Long Term Evolution (LTE); 3GPP Universal Mobile Telecommunications System (UMTS); Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); Global System for Mobile Communication (GSM) Enhanced Data Rate for GSM Evolution (EDGE) RAN or GERAN; UMTS Terrestrial Radio Access Network (UTRAN); or LTE Advanced. Additionally, aspects of the subject innovation can be advantageously exploited particularly in legacy telecommunication technologies.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
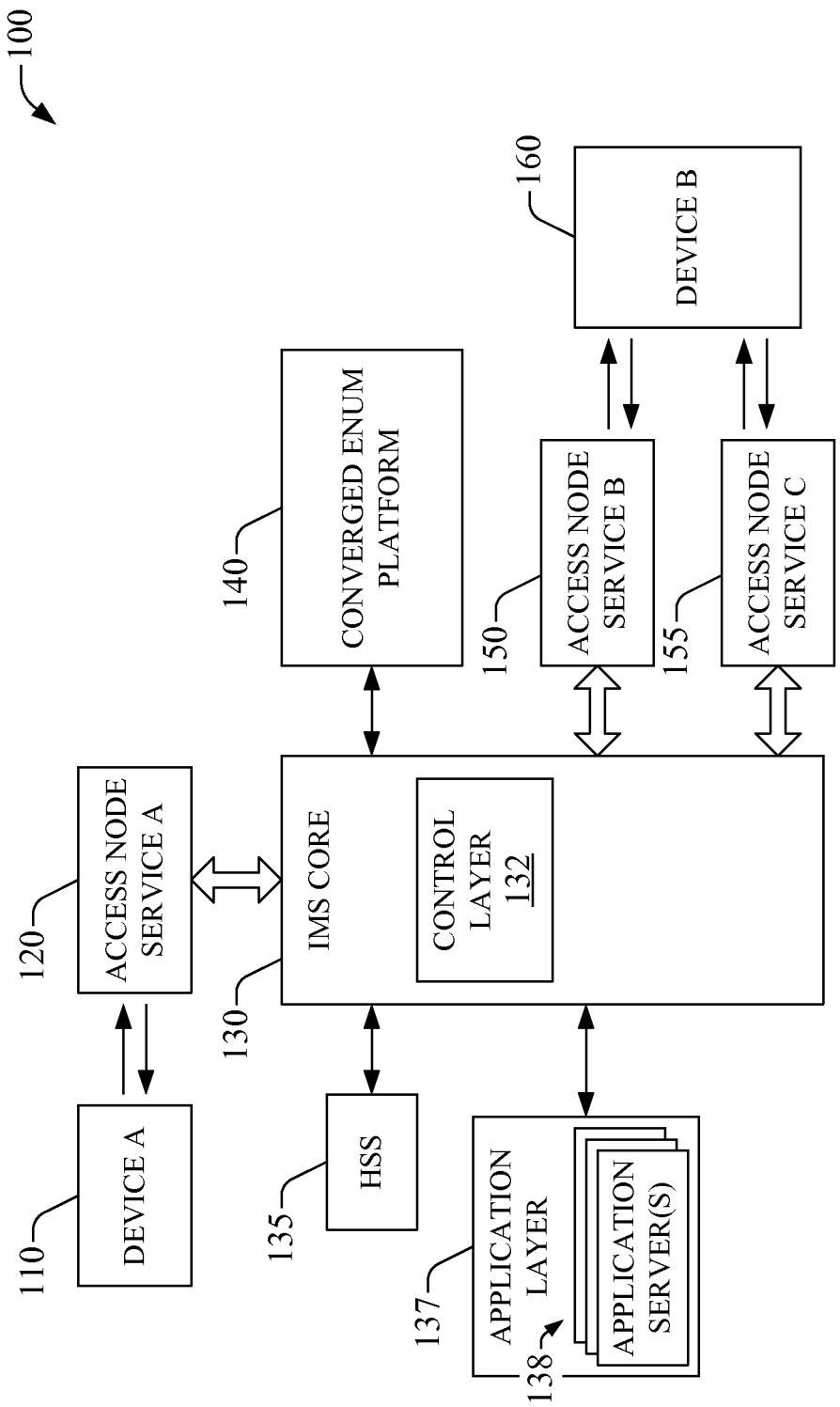
FIG. 1 is a schematic example network environment that can operate in accordance with aspects described herein.

The subject innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the subject innovation may be practiced without these specific details. In other instances, well-known structures and devices are shown in block diagram form in order to facilitate describing the subject innovation.

As used in this application, the terms "component," "system," "platform," "layer," "node," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth. The term "prosumer" indicates the following contractions: professional-consumer and producer-consumer.

With reference to the drawings, FIG. 1 is a schematic example network environment 100 that can operate in accordance with aspects described herein. IMS core network (CN) 130, also termed herein IMS core 130, Home Subscriber Server (HSS) 135, and converged ENUM platform 140 can be part of an integrated interface that allows utilization of various communication services based at least in part upon various disparate technologies, e.g., CS-based or PS-based technologies. It is noted that while converged ENUM platform 140 is illustrated as external to IMS core 130, at least a portion of ENUM platform 140 can reside within IMS core 130; for instance, control layer 132 can comprise one or more components of ENUM platform 140 and effect functionality thereof. Control layer 132 enables session establishment control and routing functionality for call sessions. It is noted IMS core 130 and HSS 135 are employed as illustrative examples of the various IP-based or packet-based networks in which aspects or features of the subject innovation can be implemented and advantageously exploited.

Disparate devices, mobile or otherwise, can exploit access nodes that provide entry points to the integrated environment. It should be appreciated that such integrated environment includes other functional components and platforms (not shown) that provide the various services. In an aspect of the subject innovation, converged ENUM platform 140 enables routing of call sessions among devices that utilize disparate services for communication. For example, device A 110 has an E.164 telephone number associated therewith and can be a device that exploits VoIP (e.g., service A) for voice calls and accesses the VoIP via access node A 120 to service A, which is functionally linked to IMS core 130 for call session establishment, e.g., through Session Initiation Protocol (SIP) or setup signaling H.323 protocol(s); routing; billing; and service consumption such as exchange of data and signaling associated with execution of one or more applications that provide, at least in part, service A. Device A 110, which can be mobile or otherwise, is functionally connected to access node 120 to service A through a suitable link, wireless or otherwise. When mobile device A 110 is mobile, in addition to suitable links, device 110 exploits radio access network (RAN) component(s), e.g., base station(s), to communication with access node 120. In addition, device B 160 also has an E.164 telephone number associated therewith and can exploit service B, accessed via access node B 150, and service C, accessed through access node C 155. Device B 160 is functionally connected to associated access nodes through at least one of respective suitable links, wireless or otherwise, or RAN component(s). Service B can be a video exchange service and service C can be CS voice communication. Accordingly, access node B 150 can be an access Session Border Control (SBC) node while access node C 155 can be a CS gateway (GW). When mobile device A places a VoIP call for a voice session with device B, IMS core 130 provides call session control functions (e.g., transport of an INVITE request) that enable communication with converged ENUM platform for conversion of a dialed phone number into an IP-based domain name associated with device B 160. In environment 100, converged ENUM platform 140 resolves two embedded ENUM services (e.g., service A and B), which are conveyed in two NAPTR resource records (RRs), for device B 160 and routes the call to the CS voice communication service, accessed via service access node C 155 and provisioned, for example, through a GSM cellular network (not shown). It should be appreciated that conventional distributed ENUM platforms would not complete such a call since such conventional platforms would deliver two NAPTR resource records without the logic that enables proper routing. It should be appreciated that additional devices can be connected to IMS core 130 via respective access nodes, and related links, and can exploit features of converged ENUM platform 140 as described herein. Aspects or features of call routing and call completion via converged ENUM platform 140 are discussed next.

Figure 2:
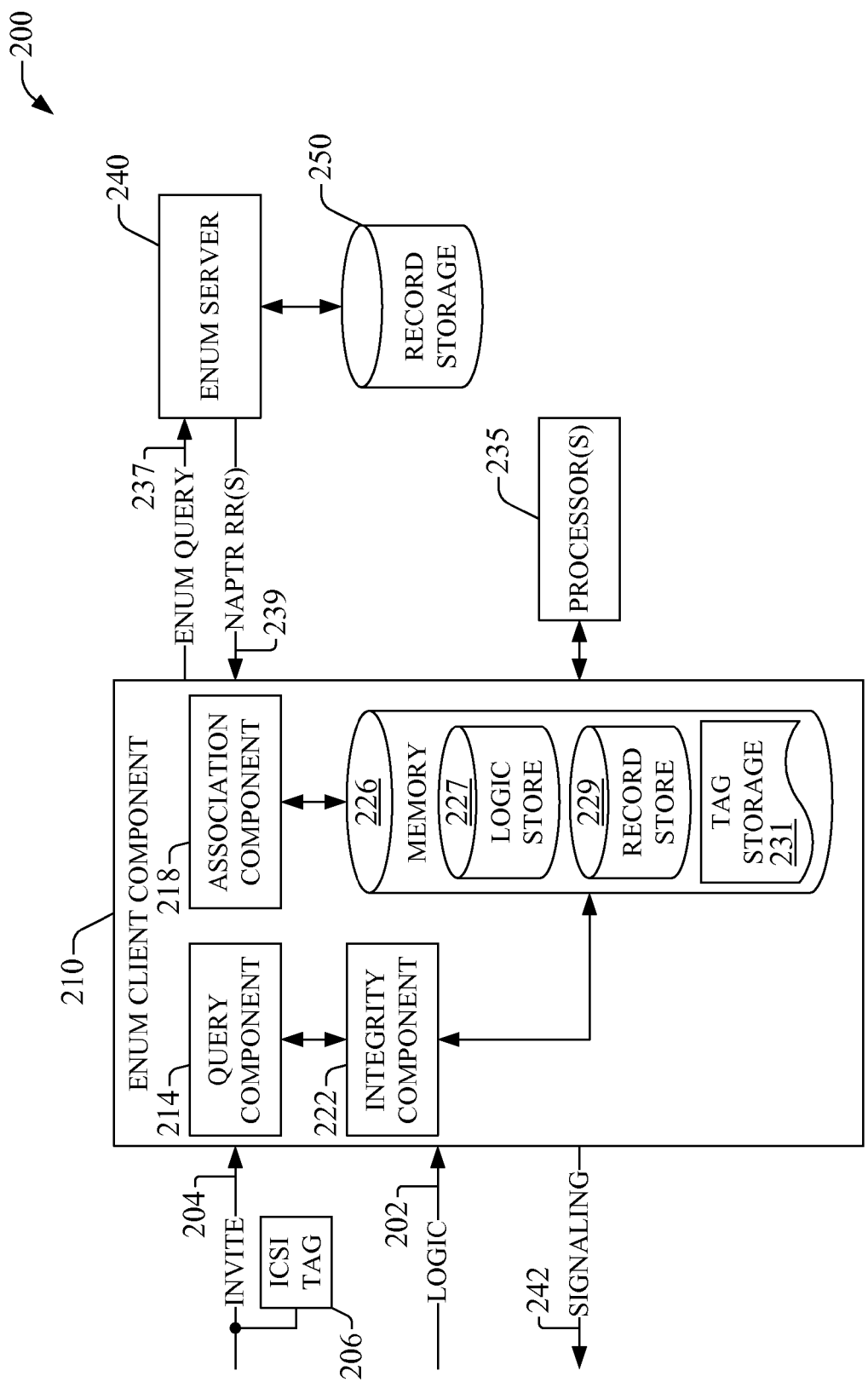
FIG. 2 illustrates a block diagram of an example system that enables call routing and completion among hybrid communication services in accordance with aspects described herein.

FIG. 2 illustrates a block diagram of an example system 200 that enables call routing and completion among hybrid communication services in accordance with aspects described herein. Hybrid services can include intra-technology, e.g., VoIP and IP-based video exchange, and inter-technology services such as CS voice and IP-video exchange. Example system 200, affords call routing and completion among various hybrid communication services through a single, or converged, architecture. The architecture includes a single ENUM client component 210 and a single ENUM server 240 that executes ENUM queries and assigns domain names to Uniform Resource Identifiers (URIs) that result form ENUM conversion of E.164 telephone numbers. ENUM client component 210 can be at least a part of at least one of a S-CSCF component an interrogating call session control function (I-CSCF) component or, a transit function component that resides within control layer 132. In an aspect, converged ENUM architecture embodied in example system 200 can allow, for example, Consumer VoIP (CVoIP) and Business VoIP (BVoIP) subscribers to send successfully a video-exchange call or a voice call to a mobility subscriber that operates CS user equipment (UE).

In an aspect of the subject innovation, substantially all or all components that generate an INVITE request to establish an IMS-based session can include or configure a service identifier tag, which can be the 3GPP-defined IMS Communications Service Identifier (ICSI) tag, within the INVITE request in order to indicate the unique IP-based service that is requested for the call session. In addition to including an ICSI tag, components that generate an INVITE request or any other request indication to establish a call session (e.g., voice or data session) can insert a list of network-supported communication services, e.g., services provided or supported by IMS core network 130 or a packet-based network that can effect, at least in part, the call session intended to be established. Inclusion or configuration of the service identifier tag can consist of selecting the service identifier tag, and writing it within the INVITE request. In addition, components that generate an INVITE request can comprise user equipment (UE), e.g., device A 110 or device B 160, or application server(s) 138 that can be part of an application layer 137 functionally coupled to IMS core network 130 or resident therein. In an aspect, the ICSI tag includes a specific label field that specifies a service indication, such as "Null", "Voice", "VideoShare," or the like, for a communication service associated with the request. Default ICSI tag can be Null, and special label "Null" can specify a default service in accordance with network operator service policy(ies). Such label field(s) can uniquely identify a communication service, and can be defined to be part of a standard protocol of IMS operation or substantially any custom service platform that provides packet-based multimedia services. Packet-based, e.g., IP-based, services can include video exchange, digital music exchange, digital photograph exchange, IP Television (IPTV) clips, or substantially any or any packetized digital content. It should be appreciated that other service-identifier tag types can be employed, as long as the tag identifier affords a one-to-one, e.g., unique, association with a provided packet-based communication service, e.g., IP-base multimedia services delivered through an IMS platform or core network.

When a subscriber initiates a call session (e.g., voice or data session), ENUM client component 210 can receive an INVITE request 204, which can include an ICSI tag 206 that can be inserted by an end-user device or user equipment (UE), mobile or otherwise, that initiates the call session, or an application server that effects at least in part the call session. Insertion of the ICSI tag 206, or substantially any service tag with the functionality of ICSI tag 206 described herein, is seamless to an end user of requester UE and requires no end-user intervention or interaction. It should be appreciated that session request mechanisms other than INVITE can be employed, particularly in IP-based or packet-based networks other than an IMS network. A service tag can be incorporated within such session request mechanisms and utilized for service selection, and routing and call completion, as described in the subject specification. As an example, a requester, e.g., user equipment, an application server, or a session control component such as S-CSCF, can include the service tag in call session established in accordance with H.323 protocol(s). It should further be appreciated that insertion of ICSI tag 206, or a service tag employed in non-IMS packet-based networks, can enhance rather than restrict substantially any or any call session establishment protocols such as Session Initiation Protocol (SIP) or H.323.

Query component 214 receives the INVITE request 204 to establish an IMS call session and extracts the associated ICSI tag 206, which can be retained within tag storage 231. From dialed E.164 telephone number record in INVITE 204, query component 214 casts an ENUM query 237 in conventional manner; namely, query component 214 inverts the telephone number, without consideration of intervening digits such as "-"; introduces "." separators among each numeric digit in the phone number; and appends a Top Level Domain (TLD), which can be customized to a service provider platform (e.g., e164enum.provider.tld). Query component 214 conveys the formed ENUM query 237, e.g., $ORIGIN 3.8.0.0.6.9.2.5.5.5.1.e164enum.provider.tld, which corresponds to illustrative telephone number +1-555-296-0083, to ENUM server 240. It should be appreciated that TLD "e164enum.my.tld" can adopt other values based at least in part on the platform, e.g., server, that processes the ENUM query; for instance, the TLD can be "e164enum.att.net", "e164enum.arpa", etc.

In an aspect, prior to delivery of ENUM query 237, integrity component 222 can validate ICSI tag 206, or substantially any service tag employed to uniquely identify a communication service. It should be appreciated, however, that validation also can be conducted subsequent to delivery of ENUM query 237. Validation can include at least one of verification of presence of ICSI tag or evaluation of syntactical correctness of a service label within ICSI tag; such verification can be effected at least in part through logic retained in logic store 227. Such logic employed for validation can be part of operator policy(ies). In an aspect, when an ICSI tag is absent, integrity component 222 can automatically insert an ICSI tag based at least in part on historical usage data associated with a requester, e.g., mobile or tethered UE or an application server, that submits INVITE 204. Such automatic insertion of an ICSI tag, or substantially any or any service identifier tag, allows universal or nearly-universal interoperability amongst disparate packet-based networks, e.g., IMS core 130, or interoperability between a packet-based network and an external network, e.g., a CS network or an IP-based network.

In addition, integrity component 222 can automatically revise or correct an erroneous syntactical construction identified as part of the validation process; revision(s) can be implemented based at least in part on configured logic retained in logic store 227. ENUM client component 210 can deliver an indication of successful validation of a received ICSI tag 206 to a requester, e.g., a mobile or tethered UE, or an application server, through signaling 242. The indication can include a lightweight file, e.g., a cookie file, that comprises a log of revisions or corrections effected by integrity component 222 prior to validating the received ICSI tag 206.

When ICSI tag 206 has been validated, ENUM server 240 receives the ENUM query 237 and executes it to return a set of one or more NAPTR resource record(s) 239 associated with the dialed telephone number as conveyed in the received INVITE request 204. NAPTR resource record(s) (RR(s)) 239 can be retained in record storage 250, and can include various embedded ENUM resolution service and protocol objects associated with a single dialed telephone number; for instance, "E2U+sip", "E2U+tel", "E2U+mailto", "E2U+pres", "E2U+page", "E2U+http", "E2U+smtp", etc. Each protocol indicated in an embedded ENUM resolution service has an associated service address that enables routing the requested call session. As an example, a Hypertext Transfer Protocol (HTTP) web page can embody the service address of "E2U+http", whereas an email address can embody the service address of Simple Mail Transfer Protocol (SMTP) resolution service object "E2U+smtp". Record storage 250 can be embodied in a Domain Name System (DNS) database, and is extensible with respect to addition of protocol objects associated with valid services. In an aspect of the subject innovation, routing to a video-exchange subscriber can be allowed or enhanced through introduction of the embedded ENUM service named "E2U+videomsg:sip". Likewise, other ENUM embedded services can be introduced such as ecommerce services, e.g., "E2U+ecommerce:app". It is noted that in the subject application, each ENUM embedded service and related protocol objects reside in a single repository, e.g., record storage 250, which provides at least part of the converged features of example system 200 described herein.

Resolution or execution of query 237 can result in the following set of three records, displayed in conventional format with exception of the unique, novel ENUM service "E2U+videomsg:sip":

NAPTR 10 100 "u" "E2U+tel" "!^.*$!tel:+15552960083!"
NAPTR 10 101 "u" "E2U+videomsg: sip" "!^.*$! sip:user 1@ims.provider.net!"
NAPTR 10 102 "u" "E2U+videomsg:sip" "!^.*$!sip: user2@ims.provider.net!"

It is noted that structure of retained records in record storage 250, which includes multiple embedded service attributes linked to a single ENUM telephone number, affords generation of such disparate NAPTR resource records, which is at least one advantage of the subject innovation over conventional systems in which disparate, distributed ENUM platforms, and record repositories therein, retain a single NAPTR RR per E.164 number that is provided in response to an ENUM query. For example:

Query: $ORIGIN 3.8.0.0.6.9.2.3.6.4.1.e164enum.att.net
Response: IN NAPTR 10 100 "u" "E2U+sip" "!^.*$!sip: info@example.com!"

Therefore, when such disparate, distributed ENUM platforms associated with respective services are consolidated, response to an ENUM query fails to distinguish among each of the packet-based services associated with the resolved NAPTR RR.

In the subject innovation, when ENUM client component 210 receives an ENUM response with multiple NAPTR resource records 239 associated with disparate packet-based services, as illustrated above, the ENUM client component 210 can exploit the ICSI tag 206 in the received INVITE 204 to select a specific NAPTR resource record and process such selected record to route the session. Received record(s) can be retained in record store 229. ENUM client component 210 can deliver routing information as part of signaling 242. Routing information can include at least one of a service address associated with the ENUM embedded service protocol linked to the selected NAPTR resource record, or a logical address, e.g., an IP address, of an access node (e.g., node 155) that enables communication of traffic associated with the service identified in the ICSI tag 206. Association component 218 exploits logic retained in logic store 227 to associate received ICSI tag 206 and collected NAPTR resource records (RRs) 239; the logic employed for association is configurable and includes logic to be utilized when an ICSI tag is absent in INVITE 204, or extraction of an ICSI tag is otherwise corrupted, e.g., syntactically incorrect service label in ICSI tag, and results in unavailable ICSI tag. In an aspect, association logic can direct component 218 to utilize a default service identifier or service field attribute in accordance with aspects described herein and discussed below. In another aspect, service logic to be employed when ICSI tag is absent or irreversibly corrupted can include a directive to utilize a communication service compatible with functional capability(ies) of a user equipment provisioned to the called E.164 number as disclose in the INVITE request. Device identifiers such as Electronic Serial Number (ESN) or ICCID for the registered and active UE can allow determination of a default communication service supplied by IMS core 130, or a disparate packet-based network, and functional compatible with the provisioned UE. For user equipment that can operate in various modes or technologies, a ranking of two or more communication services, ordered in decreasing degree of complexity, e.g., top-ranked service is the least complex, such as second-generation (2G) voice service, can be employed to determine a default communication service when ICSI tag 206 is unavailable.

Through utilization of the specific, unique label field or attribute that specifies a service indication via ICSI tag 206, association logic, e.g., retained in logic store 227, can map isomorphically the specific label field to an ENUM embedded service, labeled as "enumservice"; for instance, If the ICSI tag is "VideoShare", then select NAPTR record(s) with enumservice=videomsg:sip,
If the ICSI tag is "Voice", then select NAPTR record(s) with enumservice=tel.

As in the example above, when NAPTR resource records 239 convey a plurality of matching NAPTR RRs 239, association component 218 can select a single NAPTR resource record based at least in part on values of order and preference within the NAPTR RRs that match association logic. In an aspect, order values are compared first, and smaller values are processed first. For the subset of records with same order values, preference dictate processing with smaller values of preference processed first. ENUM client component 210 can receive configurable logic employed to associate ICSI tag and NAPTR resource records via logic 202. As indicated above, such logic 102 can be part of policy(ies) of a service provider that administers a network that provides, at least in part, the communication services identified through ICSI tag 206, or substantially any service identifier tag associated with a request to establish a call session. Additionally, logic 202 also can convey the logic to be utilized with an ICSI tag is absent, as described supra.

To ensure routing processing is accurate, integrity component 222 probes whether the ENUM services conveyed in the NAPTR RR(s) 239 received in response to query 237 are valid ENUM services. It should be appreciated that validity of a service can be subscriber specific, in accordance at least in part with at least one of a called customer subscribed service(s) or UE that is provisioned or registered to a service account linked to the called customer. When service is determined, at least in part, by provisioned user equipment, device identifiers such as Electronic Serial Number (ESN) or Integrated Circuit Card Identification (ICCID) serial number can allow determination of valid communication service(s) compatible with UE functional capabilities. Validation of ENUM service is additional to integrity tests of ICSI tag 206.

It should be appreciated that ICSI tag 206, or substantially any service identifier tag that includes a specific label, or service attribute, field that uniquely identifies a communication service, allows identification of a service and selection of a single adequate NAPTR RR that enables call session routing and completion among devices that can utilize a communication service through disparate technology, e.g., radio technology or technology that provides specific functionality(ies) to the devices. ENUM platform provided through example system 200 allows a converged approach to cross-servicing, since disparate services can be properly and robustly routed, and associated call sessions properly completed. Services that can be hybridized via the converged ENUM platform embodied in example system 200 include forwarding calls to email addresses or websites, access to VoIP numbers, mobile telephone numbers, voice mail, instant messaging (IM) applications, and so forth. In particular, the converged ENUM platform described herein can provide, at least in part, a consolidated, highly reliable, scalable, and robust ENUM architecture for routing and call completion for Consumer VoIP over IMS, Mobility services over IMS, and Business VoIP services.

Example system 200 can include one or more processor(s) 235 configured to confer, and that confer, at least in part, the described functionality of ENUM client component 210, and components therein or components associated thereto. Processor(s) 235 can execute code instructions (not shown) stored in memory 226, or other memory(ies), to provide the described functionality of example system 200. Such code instructions can include program modules or software or firmware applications that implement various methods described in the subject application and associated, at least in part, with functionality of example system 200. It should be appreciated that each of the one or more processors 235 can be a centralized element or a distributed element.

Figure 3:
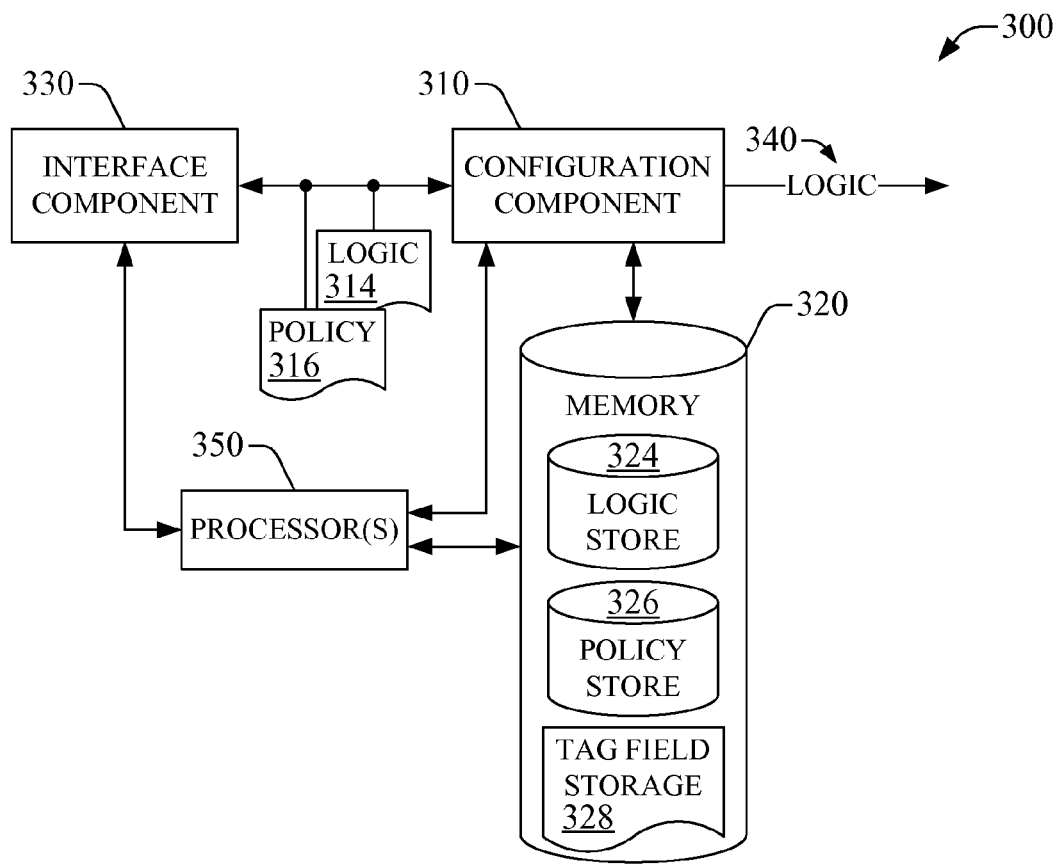
FIG. 3 is a block diagram of an example system that enables configuration of logic to associate ICSI tags and NAPTR resource records and validate ICSI tags, and configuration of service policy to monitor usage of service(s) identified through ICSI tag(s) in accordance with aspects described herein.

FIG. 3 is a block diagram of an example system 300 that enables configuration of logic to (i) associate ICSI tags, or substantially any service identifier tag, with NAPTR resource records and (ii) validate ICSI tags and NAPTR RRs; and configuration of service policy associated with usage of services identified in respective ICSI tags in accordance with aspects described herein. Configuration component 310 can receive logic 314, embodied in code instructions, and commit such logic 314 as a static or dynamic linkable library, which is retained in logic store 324 within memory 320. In addition, configuration component 210 can receive service policy 316, also termed herein policy 316, and retain such policy within policy store 326 in memory 320. Interface component 330 can afford to specify logic 314 and deliver the logic 314 to configuration component 310. Likewise, interface component 330 can enable configuration of policy 316 and delivery thereof. In an aspect, interface component 330 can be part of a Network Operations Center (NOC), or a control layer in an IMS platform or in a packet-based network. Interface component 320 can be remotely accessible through, for example, a reference link (not shown) connected to an access terminal (not shown). Logic 314 can establish an association among ICSI tags, or substantially any or any service identifier tag, retained in tag field storage 328, and NAPTR RRs, e.g., records 239, generated from ENUM query execution. An association defined by interface component 330 and committed by configuration component 310 maps a service identifier, e.g., "VideoShare", with a resolved service and protocol such as "E2U+videomsg:sip" in NAPTR resource records. Such mapping can be exploited by association component 218 to select a NAPTR record that allows, at least in part, routing and call completion. Additionally, logic 314 also can establish rules to conduct integrity checks of NAPTR RRs and ICSI tags. Such rules can include at least one of verification of syntactical correctness of ICSI tags, or substantially any service identifier tag, wherein such verification can be based on inspect-and-compare mechanisms that exploit retained service identifiers in tag field storage 328; validation of availability of identified service for an intended or called subscriber as disclosed in a call session establishment request, e.g., INVITE; or validation of embedded service indicated by a NAPTR RR.

Policy 316 or retained policy in policy store 326 can determine monitoring criteria for service usage as conveyed or revealed by service identifier flags in INVITE requests or other requests to initiate call session(s), such as setup signaling in H.323 protocol. Monitoring criteria can determine at least one of (a) monitoring periods, which can be utilized for collection of business intelligence related to consumption of a specific service; (b) monitored subscribers or segment of subscribers, for example, requested service(s) of a suspended subscriber can be monitored to ensure a session initiation request that includes a service under suspension is denied, or allowed services are authorized and effected—monitoring criteria can thus be utilized to authorize a subscriber to effect a request to establish, or initiate, a call session or receive a session establishment request; or (c) monitored services as identified by an ICSI tag, for instance, to determine volume of usage or consumption of extant or prospective service(s), or to measure effectiveness of a promotional campaign and product penetration related to a specific service.

Configuration component 310 can convey logic 340 to ENUM client component 210 or most any other network component. It should be appreciated that at least a portion of logic 314 can be subscriber specific. Likewise, service identifier tags, such ICSI tags, retained in storage 328 also are, at least in part, subscriber dependent: Disparate subscribers can acquire disparate services from a network operator and thus a service account associated with a subscriber can be assigned specific service identifier tags for each acquired service that is available; the service identifier tags can be retained in memory element 328. Service provider can assign the service identifier tags, e.g., ICSI tags.

Retained logic 324, or at least a portion thereof, also can determine routing procedures in scenarios in which an ICSI tag is absent in an INVITE request, or any other type or call session request that utilizes the ICSI tag or any service identifier tag. Logic in logic store 324 also can dictate, at least in part, syntactical rules for revising incorrectly configured ICSI tags, or substantially any other tag that uniquely identifies a service. In an aspect, in the absence of an ICSI tag, the specified logic can be dictated to autonomously generate an ICSI tag by inferring a service that is intended to be requested through the INVITE based at least in part on historical service usage of the called party; inference(s) can be accomplished trough one or more of the machine-learning techniques discussed below. An intelligent component (not shown) within association component 218 can implement such artificial-intelligence-based logic. Historical service usage can be retained, for example, in a HSS or in a component that is part of a charging architecture of an IMS platform that provides one or more services. Policy(ies) retained in policy store 326 can regulate, at least in part, the scope, e.g., time span, set of services . . . , and granularity of historical usage data. It should be appreciated that other logic is possible, such as utilizing a default ICSI tag instance, e.g., "Voice."

It is noted that logic store 324 and tag field storage 328 are re-configurable and extensible, which provides for maintaining mappings among ICSI tags and NAPTR RRs as services are added to a service platform that exploits the converged ENUM system described herein. Likewise, policy(ies) retained in policy store 326 is also re-configurable and upgradeable.

Example system 300 can include one or more processor(s) 350 configured to confer, and that confer, at least in part, the described functionality of configuration component 310 and interface component 320, as well as components therein or components associated thereto. Processor(s) 350 can execute code instructions (not shown) stored in memory 330, or other memory(ies), to provide the described functionality of example system 300. Such code instructions can include program modules or software or firmware applications that implement various methods described in the subject application and associated, at least in part, with functionality of example system 300. It should be appreciated that each of the one or more processor(s) 350 can be a centralized element or a distributed element.

It is noted that example system 300 can be part of at least one of an example converged ENUM system 200, or a control layer that resides within a packet-based network.

Figure 4:
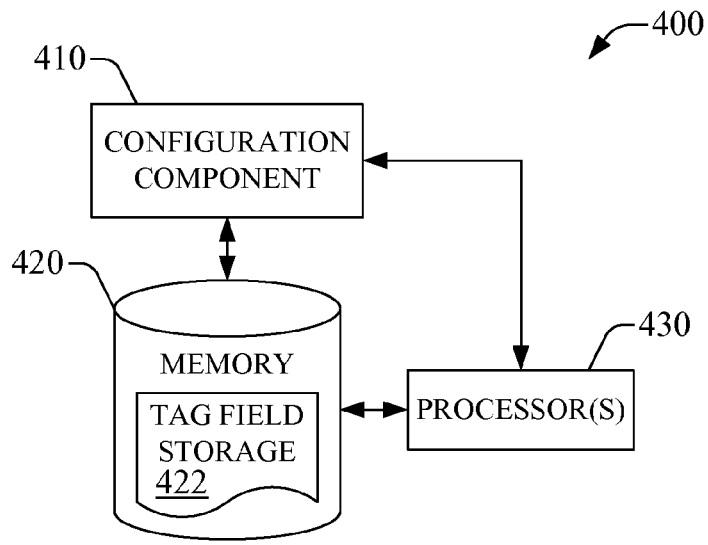
FIG. 4 is a block diagram of an example system that allows specification a service tag identifier in accordance with aspects described herein.

FIG. 4 is a block diagram of an example system 400 that allows specification of a service tag identifier, such as ICSI tag 206, in accordance with aspects described herein. Configuration component 310 allows to determine a special label field, e.g., "VideoShare", "Voice", "IPTV", "ecommerce", that conveys a service that is requested when a call session is initiated, e.g., via an INVITE request in SIP or setup signaling in H.323 protocol. Configuration component 310 also can afford selection of pre-configured service identifier tags retained in a memory element 422 within memory 420. Tag field storage 422 can have substantially the same or same structure and content as memory element 328. Pre-configured tags can be received and committed to memory by configuration component 410 at a time a customer subscribes to a network-based service (e.g., video exchange, music exchange, photo exchange, banking, ecommerce, IPTV, email, VoIP . . . ). In addition, one or more network component, such as configuration component 410, can utilize service identifier tags retained in tag field storage 422 to inform a provisioned UE or device of the communication services capabilities of a network, e.g., IMS core 130, that includes the one or more network components. It is noted that configuration component 410 can include or be coupled to an interface component (not shown) that enables specification or selection of a service tag identifier.

Example system 400 can include one or more processor(s) 430 configured to confer, and that confer, at least in part, the described functionality of the configuration component 410 and components therein (e.g., an interface component) or components associated thereto. Processor(s) 430 can execute code instructions (not shown) stored in memory 420, or other memory(ies), to provide the described functionality. Such code instructions can include program modules or software or firmware applications that implement various methods described in the subject application and associated, at least in part, with functionality of example system 400. It should be appreciated that each of the one or more processor(s) 430 or memory 420 can be a centralized element or a distributed element.

In an aspect, example system 400 can reside within one or more components that can generate a request to establish a call session in a multi-service network that includes an IMS core network, e.g., 130, or substantially any packet-based network. As an example, system 400 can reside within a mobile device or customer premises equipment (CPE), served through a landline or backhaul pipe. The mobile device can be a multi-mode, multi-technology device with CS and PS communication capabilities, and SIP or other session establishment protocol(s) functionality. As another example, system 400 can reside within an application server (AS) within an application layer of the IMS core network or an application layer linked thereto.

Various aspects of the subject innovation can be automated through artificial intelligence (AI) methods to infer (e.g., reason and draw a conclusion based upon a set of metrics, arguments, or known outcomes in controlled scenarios), for example, logic for ENUM client processing and routing when ICSI tag is absent or corrupted. Artificial intelligence techniques typically apply advanced mathematical algorithms—e.g., decision trees, neural networks, regression analysis, principal component analysis (PCA) for feature and pattern extraction, cluster analysis, genetic algorithm, or reinforced learning—to a data set; e.g., the collected subscriber intelligence in the case of subscriber segmentation. In particular, one of numerous methodologies can be employed for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation also can be utilized. In addition, linear classifiers, such as support vector machines (SVMs), non-linear classifiers like methods referred to as "neural network" methodologies, fuzzy logic methodologies also can be employed.

Figure 5:
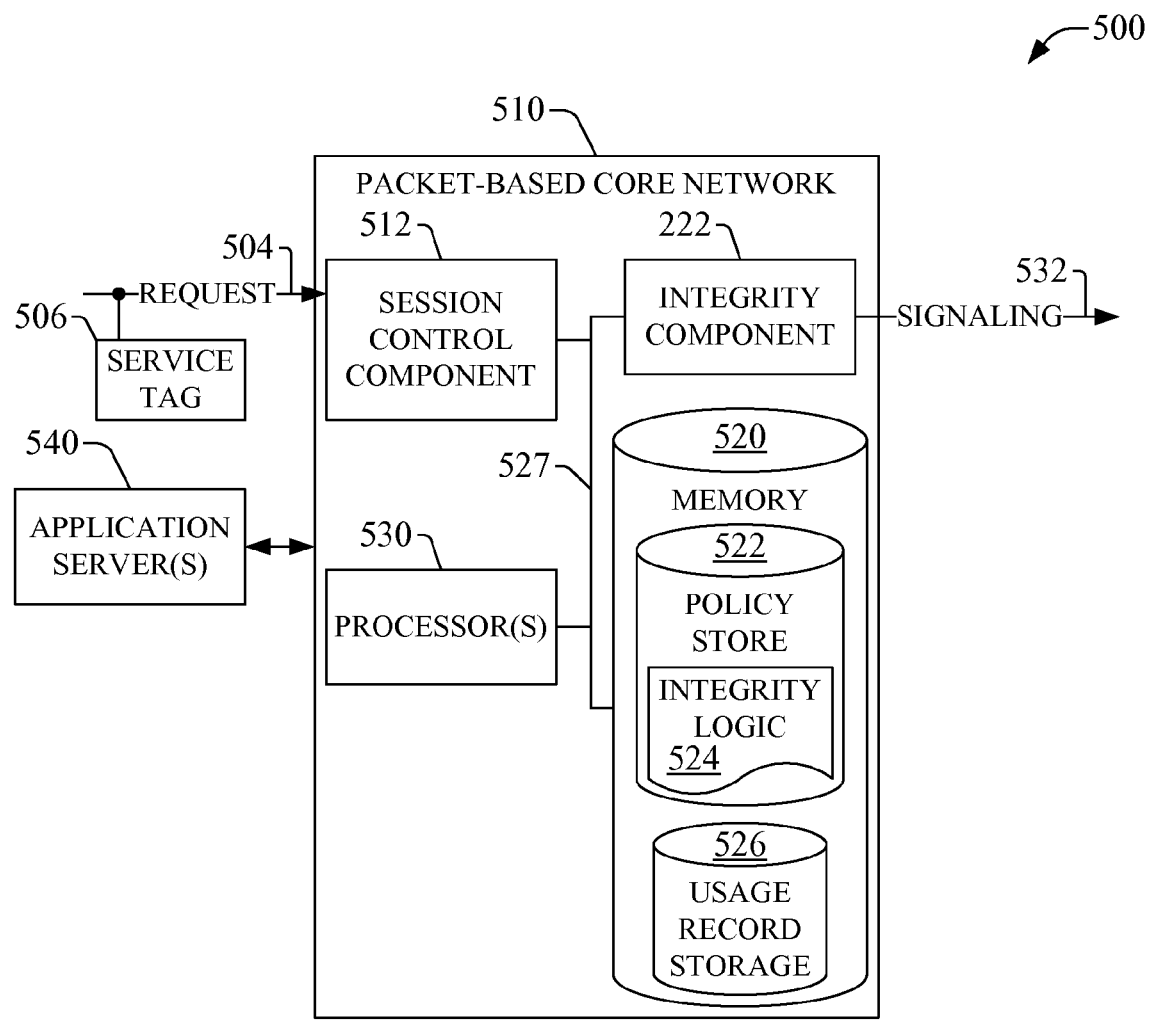
FIG. 5 is a block diagram of an example system that enables validation of communication service identifier tags inserted in a call session request, and monitoring of usage of communication service disclosed in the identifier tags in accordance with aspects described herein.

FIG. 5 is a block diagram of an example system 500 that enables validation of communication service identifier tags inserted in a call session request, and monitoring of usage of communication service disclosed in the identifier tags in a packet-based core network in accordance with aspects described herein. Packet-based core network 510 includes a session control component 512, which can be embodied in a S-CSCF node, that receives a request 204 to establish a call session, wherein the request 240 includes a service tag 506. As discussed above, the service tag 506 can be inserted or written by a requester that initiates communication of signaling to establish a call session (e.g., voice or data). Service tag 506 includes a special field attribute, or service attribute, that discloses uniquely a requested service. To validate syntactical correctness and integrity of service tag 506, session control component can exploit integrity component 222. Validation proceeds in accordance at least in part with network operator policy that establishes rules and procedures to test the validity of service tag 506. In an aspect, network operator policy, retained at least in part in policy store 522, can include integrity logic 524 which is utilized by integrity component 222 to verify correctness of service tag 504. Integrity logic 524 can be configurable by a network operator in substantially the same or the same fashion as discussed supra. As an example, integrity validation can include a test to determine whether service tag 506 discloses a service provisioned in the network for the called party of indicated in request 504. In addition, integrity validation of service tag 506 can include verification of syntactical correctness of service tag 506. As discussed supra, integrity logic 524 also can include rules or procedures for remediation of incorrect service tags and insertion of service tags in call session requests that lack a service tag. Integrity component 222 can deliver signaling 532 that indicates whether service tag 506 has been validated or integrity exceptions, or errors, have been found therein.

For validated service tags, packet-based core network 510 can monitor usage of a service conveyed by a service tag 506. Such monitoring can be based at least in part on policy(ies) retained in policy store 522 in memory 520. In an aspect, monitoring can include generation of historical usage data for at least one of a specific service, a particular customer, or a selected segment of customer. Historical usage data can be employed at least in part as business intelligence for service development or promotional campaigns. In addition, historical usage data can be utilized at least in part to generate remediation rules or procedures; for instance, an intelligent component (not shown) within integrity component 222 can infer a ranking of one or more most likely services requested for communication with a specific subscriber, and select one of the ranked communication services to be inserted in a request 504 that lacks a service tag 506. Additionally or alternatively, the intelligent component (not shown) can infer revisions of syntactically incorrect service tags through by classifying syntactical errors and learning, via a training set of erroneous service tags, adequate revisions. Such learning set can be extracted from integrity logs (not shown) that can reside within memory 520.

In one or more alternative or additional embodiments, integrity component 222 can reside within one or more of application server(s) 540, which can effect validation of service tags, e.g., ICSI tags. In such scenario, session control component 512 can supply a received service tag 506 and signal a validation request to an application server. Integrity component 222 can implement integrity check(s) that can proceed as discussed supra.

Example system 500 can include one or more processor(s) 530 configured to confer, and that confer, at least in part, the described functionality of the subject example system and components therein (e.g., session control component 512 or integrity component 222). Processor(s) 530 can connect to the components within packet-based core network 510 through bus 527 for data, signaling, or any other information exchange; bus 527 can be embodied in at least one of a memory bus, a system bus, an address bus, or one or more reference link(s) or interface(s). Processor(s) 530 can execute code instructions (not shown) stored in memory 520, or other memory(ies), to provide the described functionality. Such code instructions can include program modules or software or firmware applications that implement various methods described in the subject application and associated, at least in part, with functionality of example system 500. It should be appreciated that each of the one or more processor(s) 530 or memory 520 can be a centralized element or a distributed element.

Figure 6:
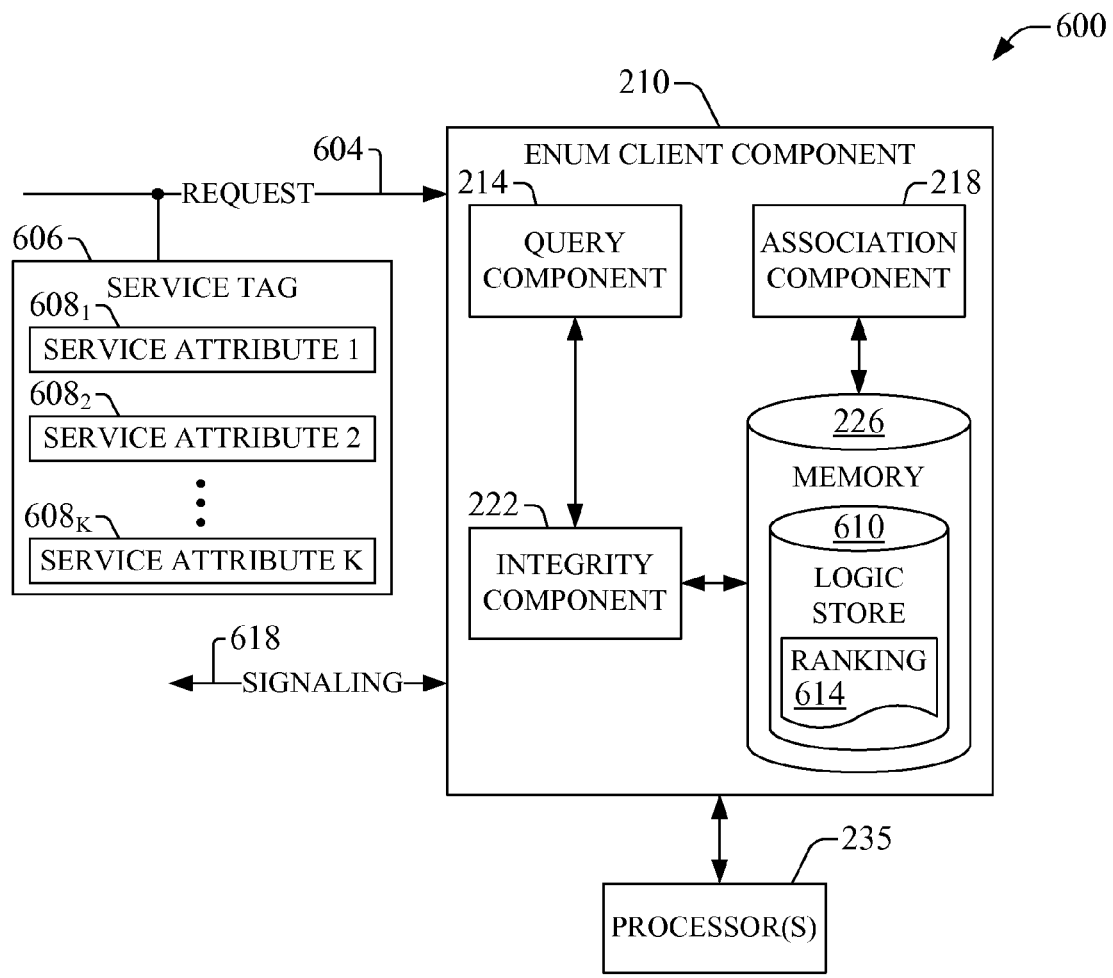
FIG. 6 illustrates a block diagram of an example system that allows call routing and completion among hybrid communication services disclosed through multiple service attributes in a service tag in accordance with aspects described herein.

FIG. 6 illustrates a block diagram of an example system 200 that enables call routing and completion among hybrid communication services disclosed through multiple service attributes in a service tag in accordance with aspects described herein. Request 604 initiates establishment of a call session and includes a service tag 606, e.g., ICSI tag, that comprises a plurality of service attributes $608_1$-$608_K$. Each of the service attributes $608_1$-$608_K$ uniquely identifies a requested service. Identified services are generally different; for example, when K=2, service attribute $608_1$ can indicate "Voice" whereas service attribute $608_2$ can indicate "VideoShare". Upon receipt of request 604, query component generates an ENUM query as described above, and delivers the set of service attributes $608_1$-$608_K$ to integrity component 222 for validation and, where applicable and feasible, remediation thereof based at least in part on logic retained in logic store 610. Logic store 610 retains substantially the same logic as logic store 227. As described supra, query component conveys the generated ENUM query to a server (not shown) and in response a set of one or more NAPTR RRs is received in response to the ENUM query.

Association component 218 receives the set or one or more NAPTR RRs and based upon association logic retained in logic store 610 determines if more than one of service attributes $608_1$-$608_K$ are to be employed for association with received NAPTR records and service routing. It is noted that association logic can be part of network operator service policy(ies), which can be configurable by a network administrator; see, e.g., FIG. 3. As described supra, association logic can be configurable and extensible, and can depend, at least in part, on at least one of a called subscriber and UE provisioned therto; a requester subscriber; identified service(s); network operating condition such as congestion level for specific access nodes; or a time at which request 604 is effected, e.g., an identified service can be utilized during predetermined hours of network operation. At least a portion of association logic also can be configured by a subscriber. When association logic establishes that a single service attribute is to be employed, a ranking 614 configured by a service provider or subscriber can dictate the service attribute, e.g., $608_K$, that is to be acted upon. Ranking 614 can be configured statically or dynamically based at least in part on at least one of service usage or subscriber associated with request 604. Configuration of ranking 614 can be performed autonomously, e.g., via an intelligent component (not shown) that can be part of association component 214 and that utilizes patterns of service usage, which can be based at least in part on historical usage data gathered as described supra and accessed through signaling 618. A default version of ranking 614 can be supply by network operator when a subscriber is registered with the network and activation of UE is provisioned. In an aspect of the subject innovation, each service attribute 608x, with k=1, 2 . . . K (K a natural number), can include a priority indication that can override ranking 614: The service with higher priority is employed by association component 214 to select a single NAPTR RR and route a call session.

In an aspect, association component 214 can utilize the top-ranked service attribute and identified service to associate the service attribute with one or more of the received NAPTR records; such association proceeds as described above, via a mapping of service attributes and ENUM embedded services identified in NAPTR records. When association is complete, routing signaling is delivered through signaling 618, which encompasses substantially the same information as signaling 242.

Alternatively, when association logic allows utilization of more than one service attribute, association component 214 proceeds to associate each of the received service attributes $608_1$-$608_K$ with received NAPTR RRs. In an aspect, association component 214 effects each association in accordance with aspects described supra. When association is complete, association component 214 delivers routing information for each of the requested services. In the previous example, when two service attributes are received in service tag 606 and service attribute 1 is "Voice" and service attribute 2 is "VideoShare", a called party can receive two streams of data associated, respectively, with a discussion of a transmitted video and data for the transmitted video. For instance, a requester customer can deliver a set of slides for a technical presentation related to SIP features to a called party through a first data stream routed via an access node, e.g., a terminating S-CSCF, and can orally explain each of the slides through a voice stream served via a CS gateway and related over-the-air interface.

Figure 7:
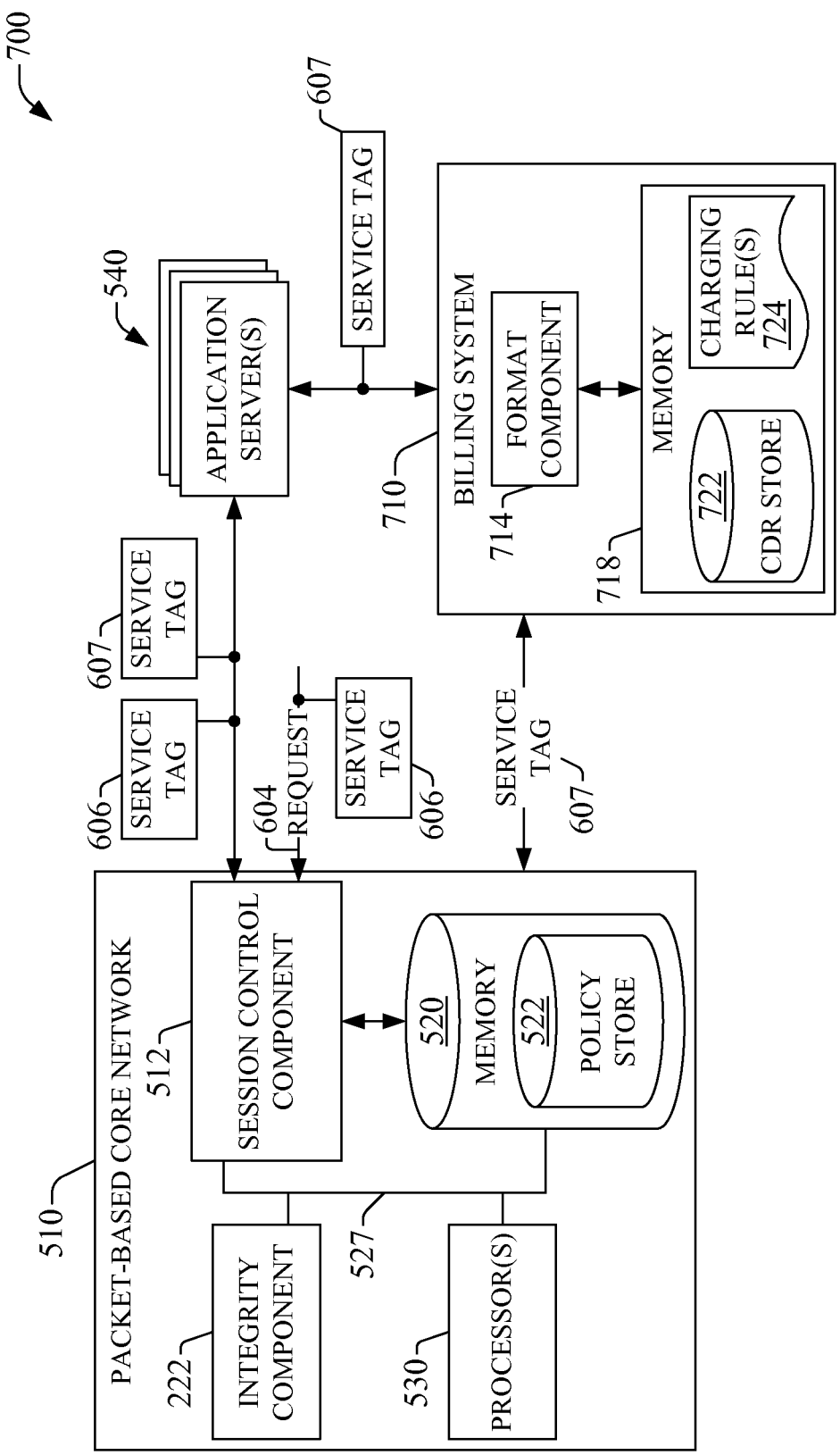
FIG. 7 presents a block diagram of an example system that exploits a validated service identifier tag, or service tag, for service billing in accordance with aspects described herein.

FIG. 7 presents a block-diagram of an example system 700 that exploits a validated service identifier tag, or service tag, for service billing in accordance with aspects described herein. When session control component 512 receives a request 604 to initiate a session call, session control component 512, which can include at least a portion of an ENUM client component, e.g., 210, conveys service tag 606 to integrity component 222 for validation or remediation. Service tag 606 can include one or more service field attributes, e.g., $608_1$-$608_K$, each of which uniquely identifies a communication service. As described supra, integrity component 222 can deliver signaling that indicates at least one of status of validation, e.g., "validation pass" or "validation fail", or a record of remediation acts implemented to service field attributes in service tag 606. For service field attributes that are successfully validated, which can include implementation of remediation procedure(s), and based at least in part on operator policy retained in policy store 522, session control component 512 can deliver a service tag 607 for implement at least part of billing procedures; service tag 607 includes a set of one or more of the validated service field attributes. Service tag 607 can be delivered to billing system 710, which can be part of backend services of a network that administers packet-based core network 510. Billing system 710 can include a format component 714 that identifies communication services disclosed by service field attributes received through service tag 607 and formats billing information, or billing data based at least in part on at least one of the received service field attributes or charging rule(s) 724. Billing information is associated with online or offline services that can be supplied by application server(s) 540. Billing system 710 can incorporate, through format component 714, formatted billing data in one or more call detail records (CDRs) retained in CDR store 722 and associated with communication services identified through received service tag 607 and service field attributes therein. In addition, billing system 710 can include service field attributes into charging rule(s) 724, which can drive formatting of billing information and inclusion of billing data in CDRs linked to service(s) provided in fulfillment of a call session establishment request 604. At least a processor (not shown) can effect the functionality of billing system 710, and associated component(s). To at least that end, the at least one processor (not shown) can execute code instructions (not shown) retained in one or more memory(ies), e.g., memory 718.

In an aspect, of the subject innovation, an application server that is part of application server(s) 540 also can generate a request 604 that includes service tag 606. In such scenario, the application server can convey service tag 606 to session control component 512 for validation, which occurs as described supra. It is noted that in one or more alternative or additional embodiments, application server(s) 540 can include integrity component 222 to conduct the various integrity checks described herein. When validation is complete, session control component 512 can deliver service tag 607 to the application server, which conveys the service tag 607 to billing system 710 to implement, at least in part, charging for offline or online services.

Figure 8:
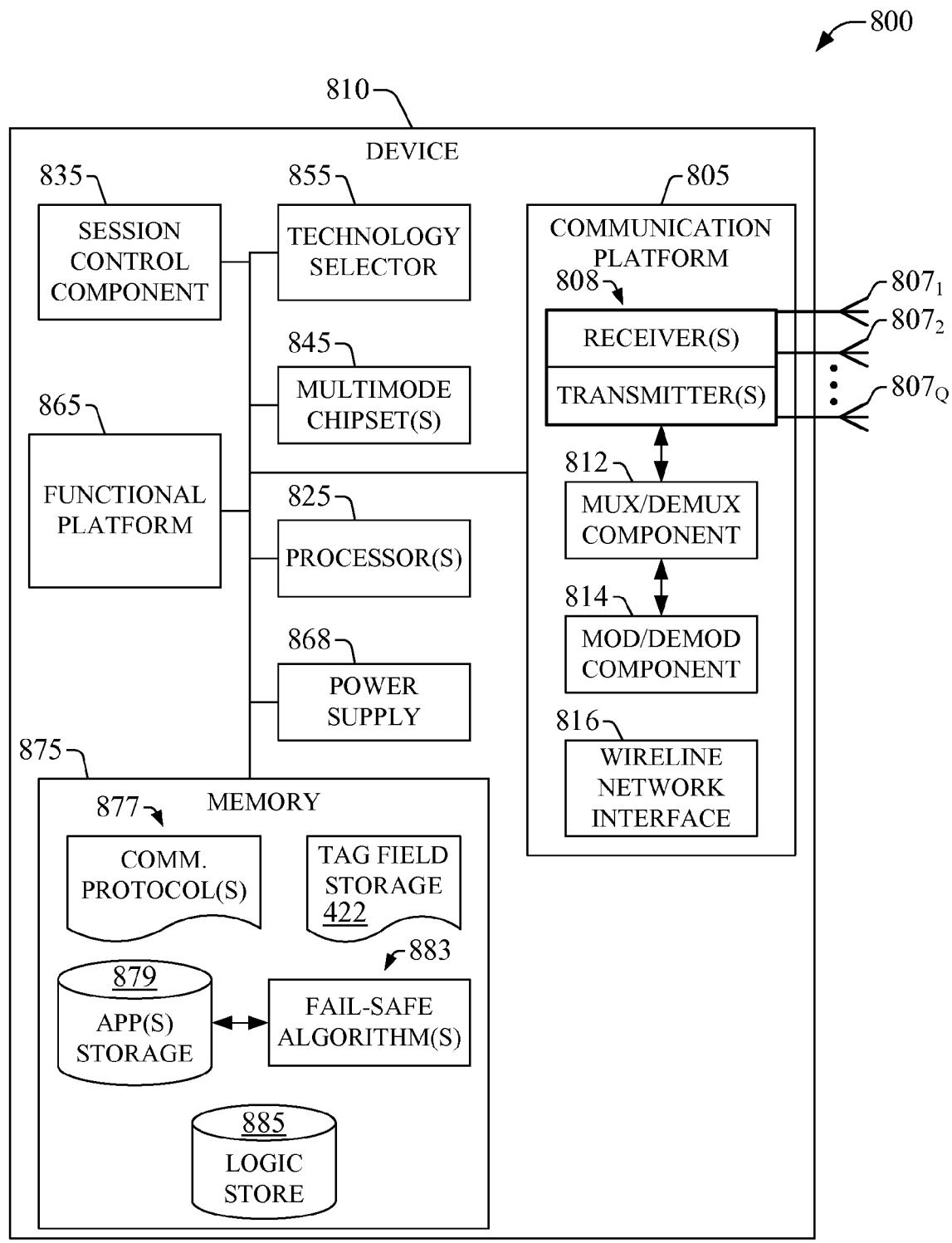
FIG. 8 is a block diagram of an embodiment of a device that can exploit communication services supplied by a packet-based network in accordance with aspects of the subject innovation.

FIG. 8 is a block diagram of an embodiment 800 of a device that can exploit communication services supplied by a packet-based network, e.g., IMS core 130 or core network 510 in accordance with aspects of the subject innovation. In an aspect, device 810 embodies user equipment, e.g., device A 110 or device B 160. In device 810, which can operate in multi-technology multimode, a set of antennas $807_1$-$807_Q$ (Q is a positive integer) can receive and transmit signal(s) from and to wireless devices such as base stations, access terminals, wireless ports and routers, and so forth, that operate in a radio access network. It should be appreciated that antennas $807_1$-$807_Q$ are a part of communication platform 805, which comprises electronic components and associated circuitry that provide for processing and manipulation of received signal(s) and signal(s) to be transmitted.

Communication platform 805 includes receiver(s)/transmitter(s) 808 that can convert signal from analog to digital upon reception, and from digital to analog upon transmission. In addition, receiver(s)/transmitter(s) 808 can divide a single data stream into multiple, parallel data streams, or perform the reciprocal operation; such operations typically conducted in various multiplexing schemes. Functionally coupled to receiver(s)/transmitter(s) 808 is a multiplexer/demultiplexer (mux/demux) component 812 that facilitates manipulation of signal in time and frequency space. Electronic mux/demux component 812 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 812 can scramble and spread information (e.g., codes) according to substantially any code; e.g., Hadamard-Walsh codes, Baker codes, Kasami codes, polyphase codes, and so on. A modulator/demodulator (mod/demod) component 814 is also a part of communication platform 805, and can modulate information according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like. In an aspect of embodiment 800, mod/demod component 814 is functionally coupled to mux/demux component 812. Processor(s) 825 allows, at least in part, device 810 to process data (e.g., symbols, bits, or chips) for multiplexing/demultiplexing; modulation/demodulation, such as implementing direct and inverse fast Fourier transforms; selection of modulation rates, selection of data packet formats, or inter-packet times; and other conventional operations that enable wireless communication Additionally, communication platform 805 can include a wireline network interface 816 that enables communication of data and signaling through a wired network, such as a broadband network, a cable network, a conventional Public Switched Telephone Network (PSTN), or CS networks. It should be appreciated that device 810 can receive wireless data or signaling through receiver(s)/transmitter(s) 808 and relay such data or signaling via wireline network interface 816. Alternatively or additionally, device 810 can implement communication solely via wireline network interface 812, as it can be the case when device 810 effects a communication, e.g., a VoIP call session. In an aspect, wireline network interface 816 can afford functional connection and communication with one or more access nodes functionally coupled to a packet-based core network, e.g., IMS core 130.

In an aspect of the subject innovation, communication platform 805 can receive a session initiation request, e.g., an INVITE request, and relay the request to session control component 835. Session control component 835, through processor(s) 825, can select, initiate, launch, or terminate execution of the set of one or more applications based on a received service tag, e.g., ICSI tag 206, and one or more service field attributes, e.g., $608_1$-$608_K$, included therein which uniquely identify a requested service. The one or more applications can be retained in application(s) storage 822 within memory 875. To enable, at least in part, invocation of a specific application, session control component 835 can exploit content(s) of tag field storage 422 to assist with identification of a requested service and related application within application storage 822. In addition, session control component 835 can utilize service logic retained in logic store 885 to initiate and launch a plurality of applications that support a plurality of communication services when a received service identifier includes a plurality of service field attributes that identify respective communication services. Logic retained in logic store 885 can be provisioned by the network, e.g., IMS core 130, and can include at least a portion of logic retained in network logic store 610. Likewise, tag field storage 422 can be received from the network during registration or activation provisioning of device 810.

Session control component 835 also can initiate a call session and convey, through communication platform 805, a request to establish a session, e.g., an INVITE request. To request a session, session control component 835 can exploit communication protocol(s) retained in memory element 877, which can comprise SIP or H.323 protocol(s). When a request to initiate a call session is generated, session control component 835 inserts a service identifier tag, e.g., ICSI tag, that includes a set of one or more service field attributes, retained in tag field storage 422, that uniquely identify a requested communication service. Such insertion does not require end-user intervention besides execution of an application that acts as a driver application that indicates session control component 835 to generate a request to establish a call session.

In embodiment 800, multimode operation chipset(s) 845, also termed herein multimode chipset(s) 845, can allow device 810 to operate in multiple communication modes through (i) various radio network technologies (e.g., Second Generation (2G) technology such as GSM, Third Generation (3G) technology of which 3GPP UMTS is an example, Fourth Generation (4G) illustrated by LTE Advanced . . . ) in accordance with disparate technical specifications, or standard protocols, for the radio network technologies; and (ii) one or more wired PS or wired CS communication mechanisms. In particular, multimode chipset(s) 845 can utilize communication platform 805 in accordance with standard protocols specific to a mode of communication operation; such standard protocols can be retained in communication protocol(s) 877 within memory 875. In another aspect, multimode operation chipset(s) 845 can be scheduled to operate concurrently (e.g., when Q>1) in various modes or within a multitask paradigm; for instance, antennas $807_1$-$807_Q$ can receive voice wirelessly and a data stream for a specification application through wireline network interface 816. Such hybrid mode of operation can be configured, at least in part, through session control component 835 via processor(s) 825.

In device 810, technology selector 855 can operate, or drive operation of, multimode chipset(s) 845 through selection of one or more radio network technologies for communication in a specific telecommunication mode. In an aspect of the subject innovation, as described above, selection of a technology resource can be dictated at least in part by one or more service identifier tags, e.g., an ICSI tags, that uniquely indicate a communication service. Based at least in part on the one or more service identifier tags, session control component 835 can signal technology selector 855 to configure multimode chipset(s) to operate in a specific communication mode.

Device 810 also includes a functional platform 865 that comprises a set of components (not shown) that provide, at least in part, one or more specific functionalities that complement or supplement wireless communication. As an example, in the case mobile device 810 is a telephone, functional component includes functional elements such as a data entry interface (e.g., a keyboard, a biometric pad for biometric-based access, a microphone, a loud speaker . . . ), a camera, peripheral connectors (e.g., a Universal Serial Bus (USB) port for transferring data to a disparate device), a voice coder-decoder (vocoder), and so on. It should be appreciated that functional platform 865 can exploit applications stored in application(s) storage 822 within memory 875 to provide one or more functionalities. In an aspect of the subject innovation, technology selector 855 can exploit one or more driver applications in application(s) storage 879 to interface with functional platform 865, via processor(s) 825, to properly realize and execute radio technology and application(s) combinations in device 810.

Device 810 can convey, through communication platform 805, a set of one or more communication service capabilities to a network administered by a service provider. Communication service capabilities are supported through one or more applications retained in memory element 879, and provide at least part of operational features of functional platform 865. In an aspect, device 810 can identify and select a set of communication services that are available based at least in part on service identifier tag, and associated service field attributes, retained in tag field storage 422. Selection of communication services can determine which communication service capabilities are conveyed to the network administered by the service provider. Delivery of an indication of service capabilities of device 810 can occur at the time of provisioning and registration of device 810, or at substantially any time thereafter. Moreover, an indication of service capabilities can be supplied to the network upon request by one or more network components, e.g., ENUM client component 210.

In an aspect, functional platform 865 can include a display interface that allows gestures for subscriber-device interaction via at least one of a screen (e.g., a liquid crystal display (LCD), a plasma panel, a monolithic thin-film based electro-chromic display . . . ), a sound interface, and so forth. Additionally, display interface 635 can render content(s) that (i) control functionality of device 810 as available in functional platform 865, (ii) reveal operation conditions of device 810, or (iii) allow selection of a communication service and initiation of a call session.

Device 810 further includes power supply 868, which can power up components or functional elements within device 810. When device 810 is wireless, power supply 868 can be generally a rechargeable power supply, e.g., a Li-based rechargeable battery, and it can include one or more transformers to achieve power level(s) adequate to operate device 810 and components, functional elements, and related circuitry therein. In an aspect, power supply 868 can attach to a conventional power grid to recharge and ensure device 810 is operational. Moreover, power supply 1685 can include an energy conversion component (not shown), such as a solar panel, to provide additional or alternative power resources or enhanced autonomy to device 810. In case device 810 is a pseudo-stationary tethered apparatus, power supply 868 can include an input/output (I/O) interface (not shown) to connect operationally to the conventional power grid and furnish power to device 810.

In an aspect, memory 875 is at least in part a subscriber-specific removable computer-readable storage medium such as for example a subscriber identity module (SIM) card, which can be relocated between mobile devices in order to port display and network selection preferences. Memory 875 also retains fail-safe algorithm(s) 883 that facilitate operation of device 810 when radio technologies deemed preferred are not available, or technology selector 615 is faulty or unavailable in a mobile device. In another aspect, fail-safe algorithm(s) 683 also facilitates operation and wireless communication of device 810 via legacy radio technology layer(s).

Additionally, memory 875 can store data structures (e.g., metadata); code structure(s) (e.g., modules, objects, classes, procedures) or instructions, or substantially any type of software or firmware that processor 665 can execute to provide functionality associated with substantially any component, platform, interface, selector and so forth, within mobile 810, in accordance with aspects of the subject innovation. Moreover, memory 875 can also retain (not shown) network or device information like specifications, address book(s); code sequences for scrambling, spreading, blind decoding hypothesis, semi-persistent scheduling parameters, pilot signal(s) (e.g., reference signal(s)); frequency offsets, cell identifiers (IDs), and so on. Furthermore, memory 675 also can retain content(s) (e.g., multimedia files, subscriber-generated data); security credentials (e.g., passwords, encryption keys, digital certificates, biometric reference indicators such as voice recordings, iris patterns, fingerprints); hardware identifying tokens such as IMSI, a serial product number such as MEID and the Telecommunications Industry Association (TIA) electronic serial number (ESN); and so forth.

Device 810 also includes a processor 825 configured to confer functionality, at least in part, to substantially any component, platform, interface, selector and so forth, within Device 810, in accordance with aspects of the subject innovation. In embodiment 800, processor(s) 825 is illustrated as external to the various functional elements (e.g., components, interfaces, platforms, selectors . . . ) of device 810; however, processor 635 can be distributed across such various functional elements. In addition, processor(s) 825 is functionally coupled (e.g., through a memory bus) to memory 875 in order to store and retrieve information such as code instructions, data structures, etc., necessary to operate and/or confer functionality, at least in part, to communication platform 805, technology selector 855, multimode chipset(s) 845, and other operational components (not shown) of multi-mode mobile 810.

Figure 9:
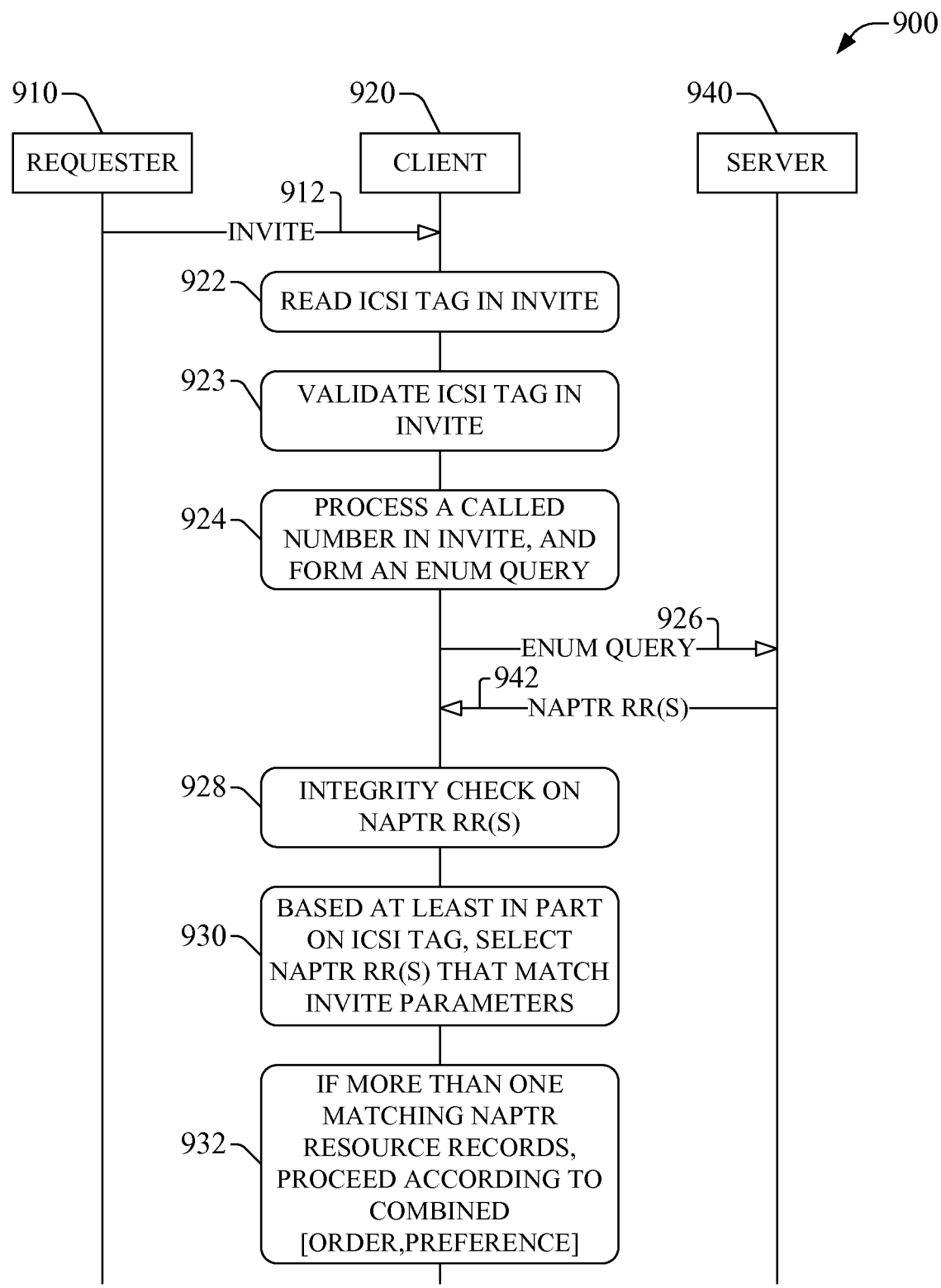
FIG. 9 is an example call-flow diagram for at least a portion of ENUM client processing that utilizes an ICSI tag according to aspects described herein.

In view of the example system(s) described above, example method(s) that can be implemented in accordance with the disclosed subject matter can be better appreciated with reference to call flow in FIG. 9 and flowcharts in FIGS. 10-16. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein can alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages described herein. It should be further appreciated that the example methods disclosed throughout the subject specification are capable of being stored on an article of manufacture to facilitate transporting and transferring such example methods to computers for execution, and thus implementation, by a processor or for storage in a memory.

FIG. 9 is an example call-flow method 900 for at least a portion of ENUM client processing that utilizes an ICSI tag according to aspects described herein. A requester 910, which can be an end-user device, e.g., a mobile handset, or an application server, conveys an INVITE request 912 that includes an ICSI tag, e.g., 206. Requester 910 writes or configures the ICSI tag in INVITE request 912. Requester 910 also can configure, or set, the ICSI tag in a REGISTER request. More generally, requester 910 can set the ICSI tag in a SIP request. It is noted that most any communication service tag defined to be part of an INVITE message, substantially any session establishment request message, also can be configured and employed. At 922, client 920 receives INVITE request 912 and reads the ICSI tag included in the INVITE request. Client 920 can be embodied in ENUM client component 210. At 923, client 920 validates the read ICSI tag that is part of the received INVITE. Validation can include evaluation of syntactical correctness of the contents of ICSI flag such as the unique field attribute, or service attribute, that specifies a requested communication service. At 924, client 920 processes a telephone number received in the INVITE request 912 and forms an ENUM query 926, e.g., $ORIGIN 3.8.0.0.6.9.2.5.5.5.1.e164enum.my.tld, which corresponds to illustrative E.164 telephone number +1-555-296-0083. The ENUM query 926 is conveyed to server 940, which can be embodied in ENUM server 240. The ENUM server 940 receives the query and executes it to return all NAPTR resource records (RRs) 942, which can comprise one or more records, associated with a dialed number related to the INVITE request 912; for instance, the following are three example NAPTR RRs that can be returned:

NAPTR 10 100 "u" "E2U+tel" "!^.*$!tel:+15552960083!";

NAPTR 10 101 "u" "E2U+videomsg:sip" "!^.*$!sip:user1@ims.my.net!"; and

NAPTR 10 102 "u" "E2U+videomsg:sip" "!^.*$!sip:user2@ims.my.net!".

The one or more NAPTR resource record(s) 942 can be retained in record storage 250. At 928, client 920 performs an integrity check on received NAPTR RR(s) 942 to establish that the returned NAPTR resource record(s) 942 comprise valid ENUM services, e.g. E2U+sip, E2U+tel, E2U+videomsg:sip. At 930, based at least in part on the ICSI identified in 922 and configurable logic (e.g., logic retained in logic store 227) in client 920, the client 920 analyzes values of the specified INVITE request 912 parameters and selects matching NAPTR resource record(s) to be used in call processing, or session establishment. For example, If the ICSI tag is "VideoShare", then select NAPTR record(s) with enumservice=videomsg:sip, If the ICSI tag is "Voice", then select NAPTR record(s) with enumservice=tel.

At 932, if there is more than one matching NAPTR resource record at 930, record processing can proceed according to the combined [order, preference] value of each matching NAPTR RR: Records are sorted based on the Order field, and within each value of Order, the records are further sorted based on Preference. For instance, process sip:user1@ims.my.net first, if there is no answer, process sip:user2@ims.my.net.

Figure 10:
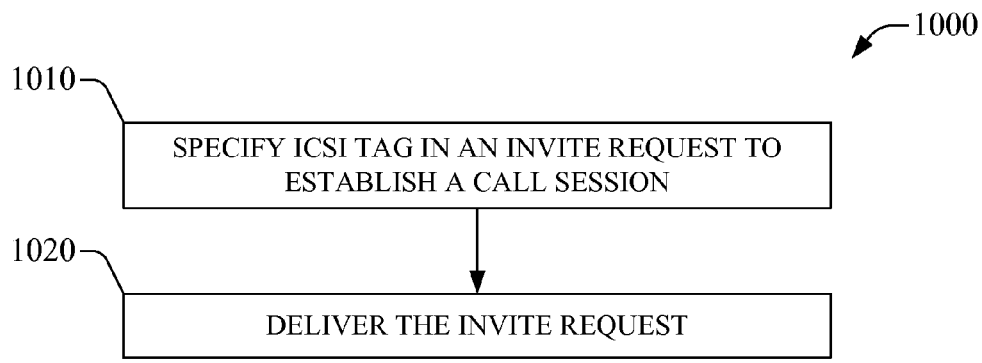
FIG. 10 is a flowchart of an example method for providing an INVITE request to establish a call session according to aspects described herein.

FIG. 10 is a flowchart of an example method 1000 for providing an INVITE request to establish a call session (e.g., from a CS-based handset to a video-enabled mobile) according to aspects described herein. The subject example method 1000 can be effected by one or more network components, e.g., an application server, or it can be implemented by a UE such as device 810. One or more processors (e.g., processor(s) 235) functionally coupled to the one or more network components, and that execute code instructions retained in memory to provide functionality, at least in part, to the one or more network components, can enact this example method 1000. Similarly, at least a processor that resides within the UE, e.g., device 810, and provides functionality thereto can enact the subject example method 1000. At act 1010, an ICSI tag is specified, e.g., inserted, configured, or written, in an INVITE request to establish a call session. As described above, the ICSI tag includes one or more special label fields, or service attributes, (e.g., "Null', "Voice", VideoShare", "PhotoShare", "MusicShare", "IPTV", "ecommerce" . . . ) that specify the unique service(s) that is being requested or is attempted to be utilized to effect, at least in part, the call session. Special label "Null" can specify a default service in accordance with service policy, which can comprise service logic. While reference is made in the subject example method to an INVITE request typical of SIP, it should be appreciated that other forms of request indications to establish a session within a IMS platform or a disparate packet-based network also can be tagged with a suitable service tag such as ICSI tag. For instance, the other forms of request indications can include session setup signaling within the H.225 protocol of the H.323 suite of signaling protocols. At act 1020, the INVITE requests that carries the ICSI tag is delivered by an end-user device, e.g., a mobile handset, or an application server such as a server in the application layer of an IMS platform.

In an alternative or additional aspect of example method 1000, act 1010 also can comprise supplying a list of one or more communication services supported by the network that receives the INVITE request, or substantially any other request to establish a call, as part of the request to initiate a call session. In an aspect, the list of one or more communication services is delivered to UE, e.g., device 810.

Figure 11:
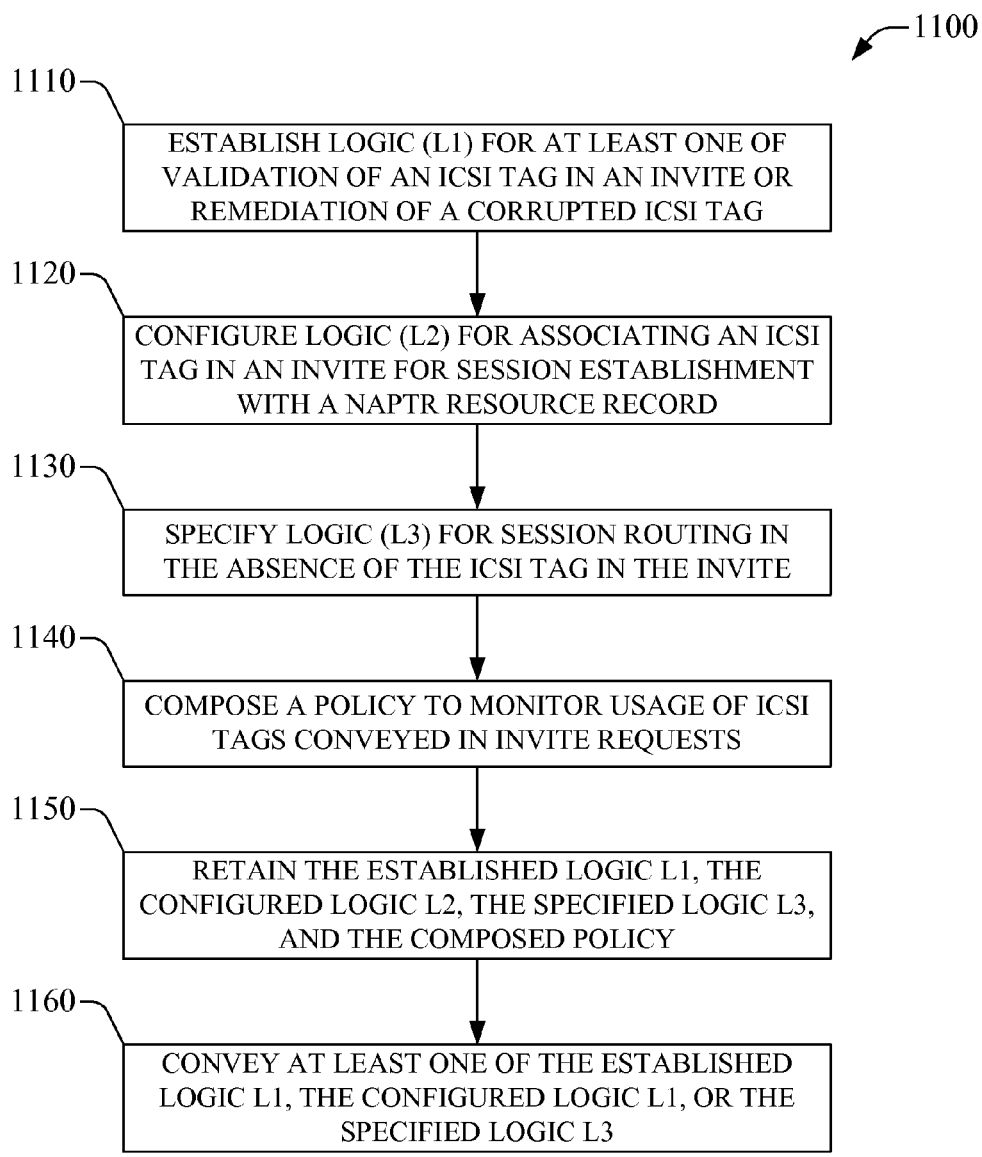
FIG. 11 is a flowchart of an example method for establishing logic for validating ICSI tags and associating ICSI tags and NAPTR resource records, and policy for monitoring usage of communication services according to aspects described herein.

FIG. 11 is a flowchart of an example method 1100 for establishing a logic for associating ICSI tags and NAPTR resource records according to aspects described herein. The subject example method 1100 can be implemented by one or more network components, e.g., a server in a network operation center, an application server in an application layer functionally coupled to a packet-base network, or an ENUM client component (e.g., component 210) that is part of a converged ENUM platform described herein. One or more processors (e.g., processor(s) 235) functionally coupled to the one or more network components, and that execute code instructions retained in memory to provide functionality, at least in part, to the one or more network components, can enact this example method 1100. It is noted that while reference is made in the subject example method to an INVITE request typical of SIP, it should be appreciated that other forms of request indications to establish a session within a IMS platform or a disparate packet-based network also can be tagged with a suitable communication service identifier tag. For instance, the other forms of request indications can include session setup signaling within the H.225 protocol of the H.323 suite of signaling protocols. At act 1110, logic (L1) is established for at least one of validation of an ICSI tag in an INVITE or remediation of a corrupted ICSI tag. Establishing the logic includes receiving at least a portion of the logic from a component (e.g., interface component 310) that provides the logic as code instructions as a part of a script (e.g., an XML-based script, a Perl script, etc.) or a program module. At act 1120, logic (L2) for associating an ICSI tag in an in INVITE for session establishment with a NAPTR resource record is configured. In an aspect, configuration of the logic includes receiving at least a portion of the logic from a component (e.g., interface component 310) that enables supplying the logic as code instructions as a part of a script (e.g., an XML-based script, a Perl script, etc.) or program module. At act 1130, logic (L3) is specified for session routing in the absence of the ICSI tag in the INVITE. As described supra, specifying the subject logic also can include receiving at least a portion thereof from a component (e.g., interface component 320) that supplies code instructions that embody the logic.

At act 1140, policy to monitor usage of ICSI tags conveyed in respective INVITE requests is composed. The policy can employ various monitoring criteria to generate historical usage data for one or more communication services, as described above (see FIG. 3 and related description). The policy can be at least part of network operator policy that regulates an IMS core network, e.g., 130, or a packet-based core network, e.g., 150, and services provided there from. At act 1150, the established logic L1, configured logic L2, the specified logic L3, and the composed policy are retained. In an aspect, the logic can be stored in a memory functionally linked to a component that enacts, at least in part, the subject example method 1100. At act 1160, at least one of the established logic L1, the configured logic L2, or the specified logic L3 are conveyed. Logic can be delivered to an ENUM client component (e.g., component 210) that is part of a converged ENUM platform as described herein.

Figure 12:
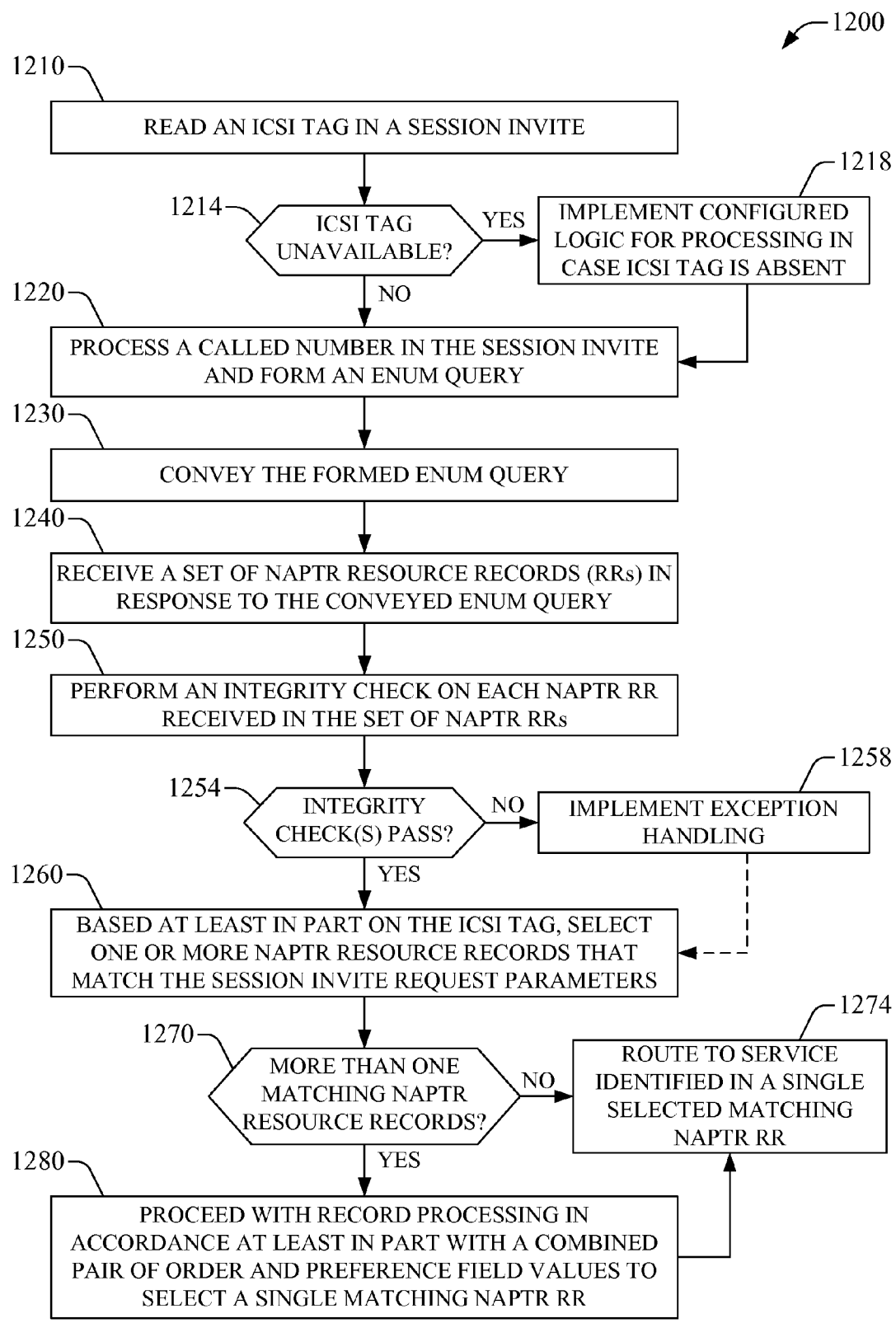
FIG. 12 displays a flowchart of an example method for ENUM client processing for routing and call completion utilizing an ICSI tag according to aspects described herein.

FIG. 12 displays a flowchart of an example method 1200 for ENUM client processing for routing and call completion utilizing an ICSI tag according to aspects described herein. The subject example method 1200 can be implemented by an ENUM client component such as component 210. One or more processors (e.g., processor(s) 235) functionally coupled to the ENUM component, and that execute code instructions retained in a related memory to provide functionality, at least in part, to the ENUM component can implement this example method 1200. While the subject example method 1200 is described in connection with an INVITE request typical of SIP and an ICSI tag inserted therein, it is noted that other forms of request indications to establish a session within an IMS platform or a disparate packet-based network also can be tagged with a suitable service tag such as ICSI tag. For instance, the other forms of request indications can include session setup signaling within the H.225 protocol of the H.323 suite of signaling protocols. Additionally or alternatively, in the subject example method, a generic service identifier tag can be employed. At act 1210, an ICSI tag in a session INVITE is read or identified. At act 1214, it is probed whether the ICSI tag is unavailable in the INVITE. In the affirmative case, configured logic for processing in case ICSI tag is absent is implemented at act 1218. In an aspect, such "fail-safe" policy allows to proceed to act 1220. Conversely, in the negative case, flow is directed to act 1220, in which a called number in the session INVITE is processed and an ENUM query is formed. In an aspect, the query is formed in accordance with conventional standard query generation, while possibly employing a custom TLD rather than a conventional or standard one. At act 1230, the formed ENUM query is conveyed. At act 1240, a set of NAPTR resource records is received in response to the conveyed ENUM query. In another aspect, an ENUM server, such as server 240, can execute the ENUM query and supply the NAPTR RRs. At act 1250 and integrity check, or validation, is performed on each NAPTR RR received in the set of NAPTR resource records; an integrity component that can be internal or external to the ENUM client that effects the subject example method implements the integrity check or validation. An integrity check can include determining whether resolved services in the NAPTR RRs are valid services, e.g., E2U+sip, E2U+tel, E2U+videomsg:sip, provided by a service platform that includes the converged ENUM system described in the subject innovation. Additional integrity checks can be included in act 1250 such as probing whether an ICSI tag extracted in act 1210 is a valid, or supported, service tag. As discussed above, ICSI tag integrity checks can include verifying syntactical correctness of a service field attribute within the ICSI tag that uniquely identifies a requested service.

At act 1254, it is determined whether integrity check(s) are passed. In the affirmative case, flow is directed to act 1260. Conversely, when integrity check(s) failed, exception handling is effected at act 1258. Exception handling can be can include notifying, through delivery of signaling (e.g., 242 in FIG. 2), the integrity checks of one or more NAPTR RRs or ICSI tag resulted in invalid or corrupted records or tags. Additionally, or alternatively, for invalid ICSI tag, exception handling can include remediation procedures, and implementation thereof, such as revising syntactical error(s) in ICSI tags or automatically inserting in an ICSI tag a field label that uniquely identifies a communication service. Remediation can proceed in accordance with configurable logic (see FIG. 3). In an aspect, when remediation is successful and an ICSI tag is automatically recovered or inserted, flow can be directed to act 1260, as illustrated with a dashed arrow-head line. At act 1260, based at least in part on the ICSI tag, and configured logic for ENUM client operation, one or more NAPTR RRs that match the session INVITE request parameters are selected. Selection proceeds in accordance with a configured mapping, or association, between a service uniquely identified in the ICSI tag conveyed through the INVITE request and an ENUM service protocol and related service address. In an aspect, as described supra, the mapping can be part of association logic that enables selection of an adequate NAPTR RR. It should be noted that the one or more NAPTR RRs are validated records in accordance with configured validation logic. At act 1270, it is probed whether there are more than one matching NAPTR resource records. In the negative case, at act 1274, client processing, e.g., implemented through ENUM client component, routes to service address in single selected matching NAPTR record. Conversely, when the outcome of act 1270 is affirmative, at act 1280 it is continued with record processing in accordance at least in part with a combined pair of "order" and "preference" field values or attributes, as described above, in order to select a single matching NAPTR RR.

Figure 13:
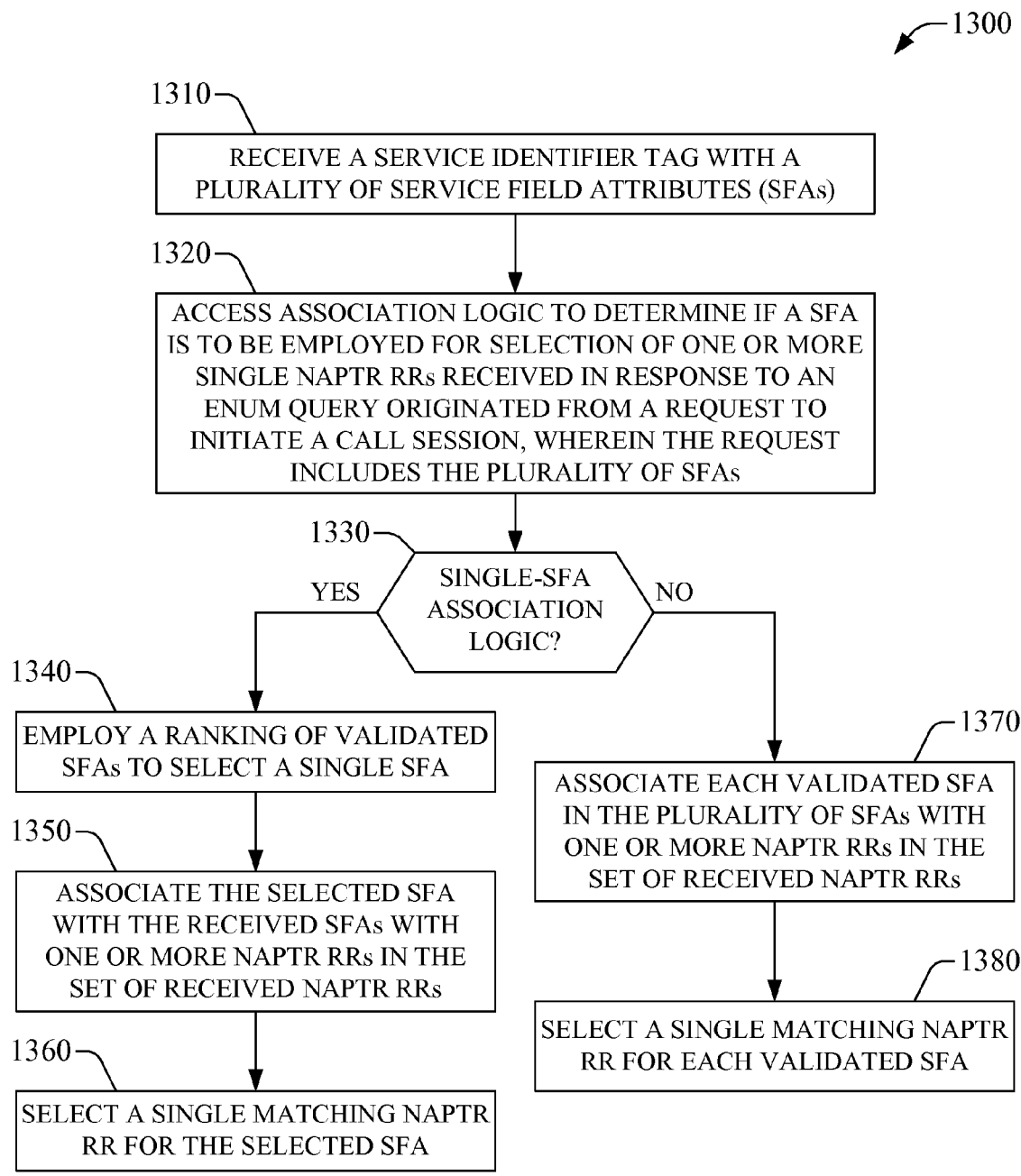
FIG. 13 is a flowchart of an example method for associating a plurality of service field attributes included in a service identifier tag in accordance with aspects described herein.

FIG. 13 is a flowchart of an example method 1300 for associating a plurality of service field attributes included in a service identifier tag in accordance with aspects described herein. The subject example method 1300 can be implemented by one or more network components, e.g., a session control component such as a S-CSCF component or an ENUM client component (e.g., component 210) that is part of a converged ENUM platform described herein an can reside within the session control component; or an application server in an application layer functionally coupled to a packet-base network (e.g., 510). One or more processors functionally coupled to the one or more network components, and that execute code instructions retained in one or more memory(ies) to provide functionality, at least in part, to the one or more network components, can enact the subject example method 1300. At act 1310, a service identifier tag, e.g., an ICSI tag, that includes a plurality of service field attributes (SFAs) is received. At act 1320, association logic is accessed, wherein the logic determines if a SFA is to be employed for selection of one or more single NAPTR RRs received in response to an ENUM query originated for from a request to initiate a call session, the requests including the plurality of SFAs. In addition, the association logic can be static or dynamic and configured by a network operator or subscriber.

At act 1330, it is determined if the logic establishes that a single SFA is to be utilized to associate SFAs with received NAPTR RRs. In the affirmative case, at act 1340, a ranking (e.g., ranking 614) of validated SFAs is employed to select a single SFA; validation can verify syntactical correctness of the received SFAs and, where applicable, remediation of corrupted SFAs in accordance with aspects described supra. At act 1350, the selected SFA is associated with the received SFAs with one or more NAPTR RRs in the set of received NAPTR RRs. At act 1360, a single matching NAPTR RR is selected for the selected SFA. Selection of a single matching NAPRT RR can include utilization of rule(s) to prioritize resource records according at least in part with a composite index [order, preference] of various NAPTR RR that match the selected SFA.

When outcome of act 1330 reveals that one or more SFAs can be associated with one or more NAPTR RRs in the set of received NAPTR RR, at act 1370, each validated SFA within the plurality of SFAs is associated with one or more NAPTR RRs in the set of received NAPTR RRs. At act 1380, a single matching NAPTR RR is selected for each validated SFA; selection of the single matching NAPRT RR can include utilization of rule(s) to prioritize resource records according at least in part with a composite index [order, preference] of various NAPTR RRs that match each validated SFA.

Figure 14:
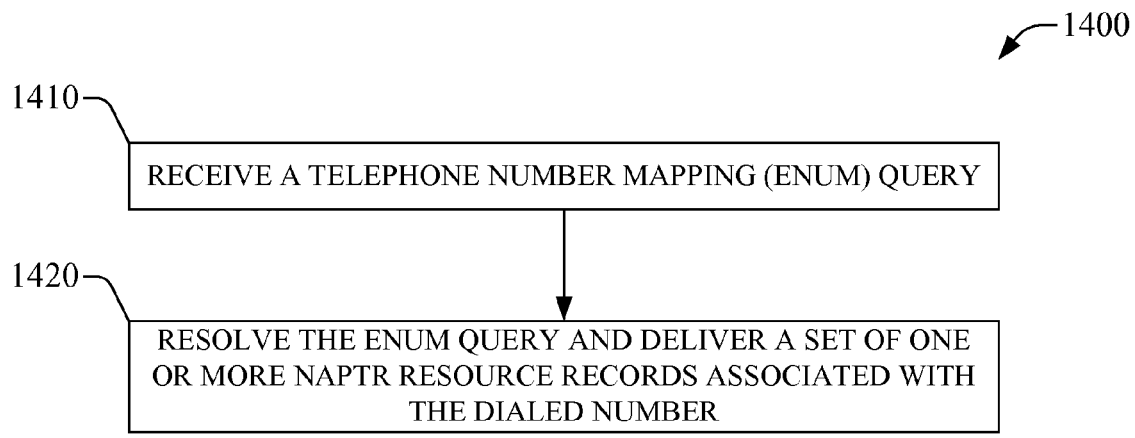
FIG. 14 presents a flowchart of an example method for resolving an ENUM query according to aspects described herein.

FIG. 14 presents a flowchart of an example method 1400 for resolving an ENUM query according to aspects described herein. The subject example method 1400 can be implemented by an ENUM server, e.g., component 240. One or more processors (e.g., processor(s) 235) that reside within the ENUM server, and that execute code instruction(s) retained in a memory functionally coupled to the server to provide functionality, at least in part, to the server can implement this example method 1400. At act 1410, a telephone number mapping (ENUM) query is received. At act 1420, the ENUM query is resolved and a set of one or more NAPTR resource records associated with a dialed number are delivered.

Figure 15:
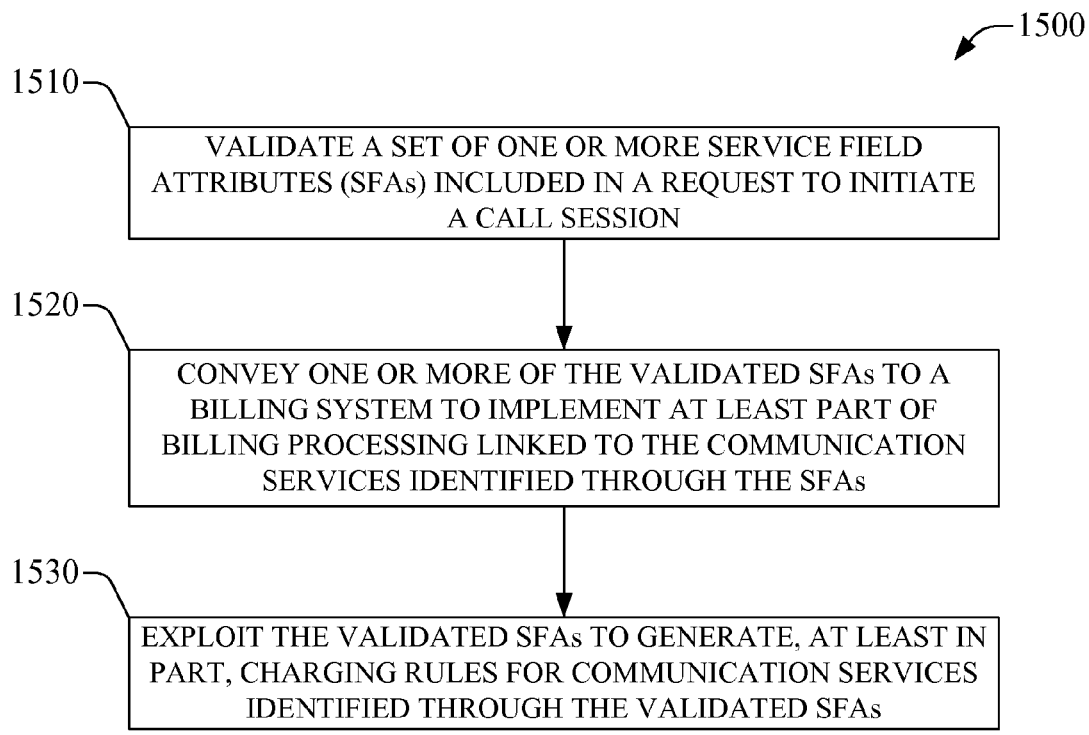
FIG. 15 is a flowchart of an example method for utilizing service field attributes (SFAs) that uniquely identify communication services to implement billing processing associated with the identified communication services in accordance with aspects described herein.

FIG. 15 is flowchart of an example method 1500 for utilizing service field attributes (SFAs), or label fields, that uniquely identify communication services to implement billing processing associated with the identified communication services in accordance with aspects described herein. One or more processors functionally coupled to one or more network components or systems, and that execute code instructions retained in one or more memory(ies) to provide functionality, at least in part, to the one or more network components or systems, can enact the subject example method 1500. At act 1510, a set of one or more SFAs included in a request to establish a call session, e.g., an INVITE request within SIP, are validated. At act 1520, one or more of the validated SFAs are conveyed to a billing system to implement at least part of billing processing linked to the communication services identified through the SFAs. At act 1530, the validated SFAs are exploited to generate, at least in part, charging rules for communication services identified through the validated SFAs.

Figure 16:
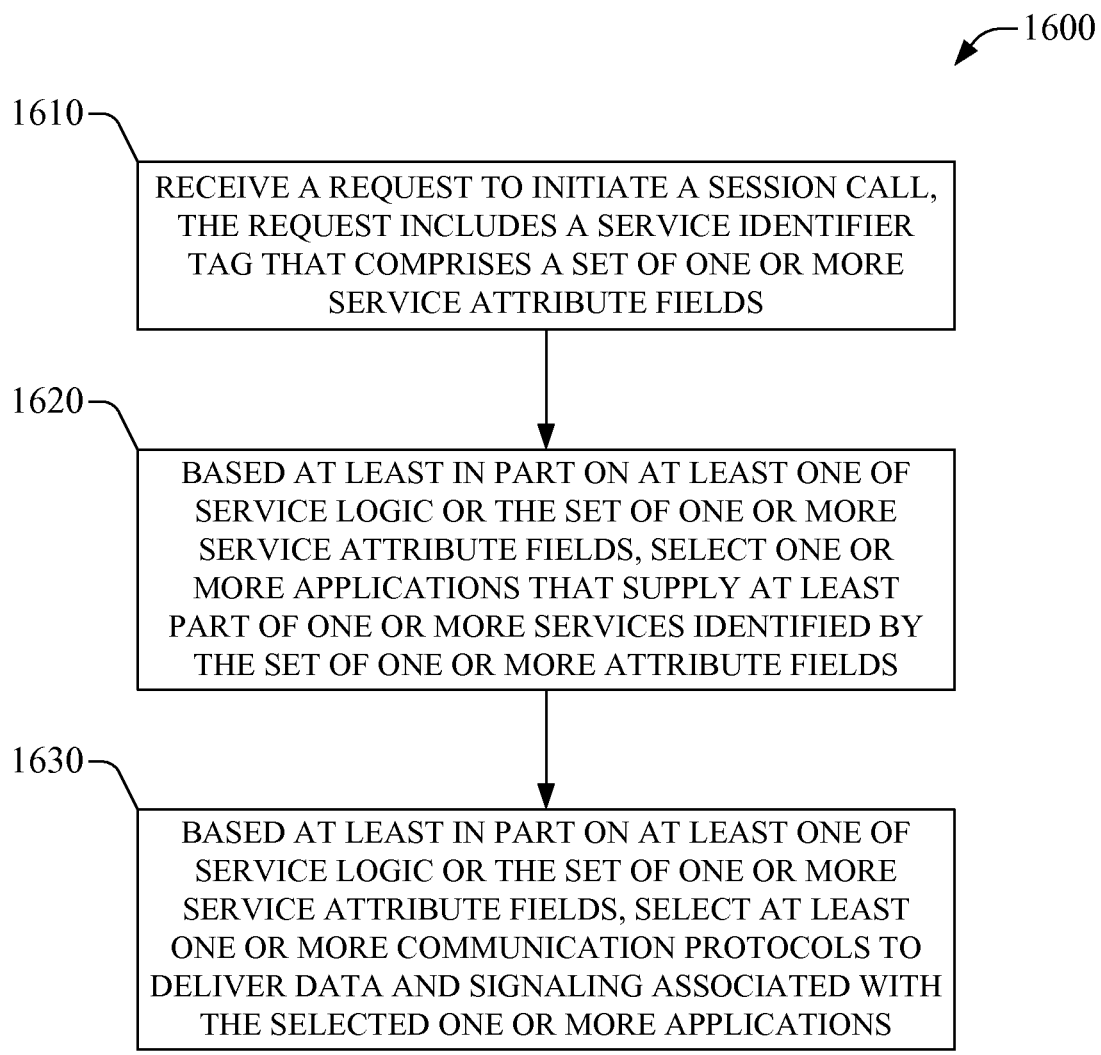
FIG. 16 is a flowchart of an example method for exploiting a service identifier tag included in a request to initiate a call session in accordance with aspects described herein.

FIG. 16 is a flowchart of an example method 1600 for exploiting a service identifier tag included in a request to initiate a call session in accordance with aspects described herein. The subject example method 1600 can be implemented by a UE such as device 810. One or more processors (e.g., processor(s) 825) functionally coupled to the one or more components within the UE, and that execute code instructions retained in memory, e.g., memory 875, to provide functionality, at least in part, to the one or more components within the UE, can enact this example method 1000. At act 1610, a request to initiate a session call is received. In an aspect, the request can be embodied in an SIP INVITE request, or in session setup signaling within the context of H.323 protocol. The request includes a service tag identifier, e.g., ICSI tag, that comprises a set of one or more service field attributes that uniquely identify a set of respective communication services. At act 1620, based at least in part on at least one of service logic or the set of one or more service field attributes, one or more applications are selected, wherein the applications supply at least part of the one or more services identified by the set of one or more attribute fields. In an aspect, service logic can be retained within a memory in the device that implements the subject example method, at least part of such policy can be received at the time the device is provisioned by a service provider network, or when communication services are introduces by the service provider network. The selected one or more application also can reside within a memory in the device. At act 1630, based at least in part on at least one of service logic or the set of one or more service field attributes, select at least one or more communication protocols to deliver data and signaling associated with the selected one or more applications. As an example, when a service field attributes is "Voice", a protocol for CS communication can be selected, whereas a service attribute that discloses "VideoShare" can result in selection of a protocol for packet-based communication.

Figure 17:
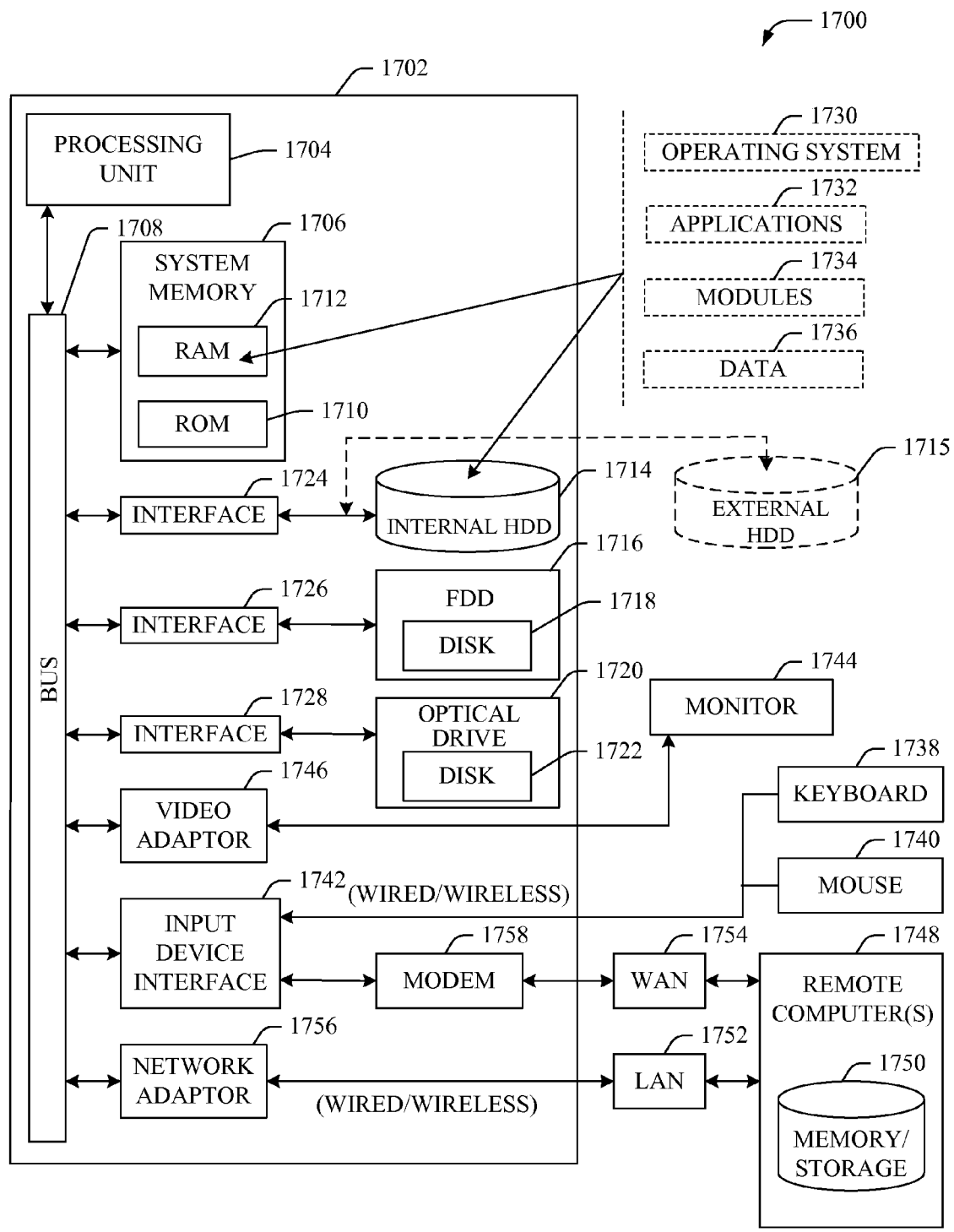
FIG. 17 illustrates an example computing environment in which the various aspects of the specification can be implemented.

In order to provide additional context for various aspects of the subject specification, FIG. 17 and the following discussion are intended to provide a brief, general description of a suitable computing environment 1700 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 17, the example environment 1700 for implementing various aspects of the specification includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi-processor architectures may also be employed as the processing unit 1704.

The system bus 1708 can be any of several types of bus structure that may further interconnect to a memory bus (with or without a memory controller), a peripheral bus, and a local bus using any of a variety of commercially available bus architectures. The system memory 1706 includes read-only memory (ROM) 1710 and random access memory (RAM) 1712. A basic input/output system (BIOS) is stored in a non-volatile memory 1710 such as ROM, EPROM, EEPROM, which BIOS contains the basic routines that help to transfer information between elements within the computer 1702, such as during start-up. The RAM 1712 can also include a high-speed RAM such as static RAM for caching data.

The computer 1702 further includes an internal hard disk drive (HDD) 1714 (e.g., EIDE, SATA), which internal hard disk drive 1714 may also be configured for external use in a suitable chassis (not shown), or an external HDD 1715 can be present in addition to internal HDD 1714, a magnetic floppy disk drive (FDD) 1716, (e.g., to read from or write to a removable diskette 1718) and an optical disk drive 1720, (e.g., reading a CD-ROM disk 1722 or, to read from or write to other high capacity optical media such as the DVD). The hard disk drive 1714, magnetic disk drive 1716 and optical disk drive 1720 can be connected to the system bus 1708 by a hard disk drive interface 1724, a magnetic disk drive interface 1726 and an optical drive interface 1728, respectively. The interface 1724 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. It is appreciated that the specification can be implemented with various commercially available operating systems or combinations of operating systems.

A user can enter commands and information into the computer 1702 through one or more wired/wireless input devices, e.g., a keyboard 1738 and a pointing device, such as a mouse 1740. Other input devices (not shown) may include a microphone, an IR remote control, a joystick, a game pad, a stylus pen, touch screen, or the like. These and other input devices are often connected to the processing unit 1704 through an input device interface 1742 that is coupled to the system bus 1708, but can be connected by other interfaces, such as a parallel port, an IEEE 1394 serial port, a game port, a USB port, an IR interface, etc.

A monitor 1744 or other type of display device is also connected to the system bus 1708 via an interface, such as a video adapter 1746. In addition to the monitor 1744, a computer typically includes other peripheral output devices (not shown), such as speakers, printers, etc.

The computer 1702 may operate in a networked environment using logical connections via wired and/or wireless communications to one or more remote computers, such as a remote computer(s) 1748. The remote computer(s) 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wired/wireless connectivity to a local area network (LAN) 1752 and/or larger networks, e.g., a wide area network (WAN) 1754. Such LAN and WAN networking environments are commonplace in offices and companies, and facilitate enterprise-wide computer networks, such as intranets, all of which may connect to a global communications network, e.g., the Internet.

When used in a LAN networking environment, the computer 1702 is connected to the local network 1752 through a wired and/or wireless communication network interface or adapter 1756. The adapter 1756 may facilitate wired or wireless communication to the LAN 1752, which may also include a wireless access point disposed thereon for communicating with the wireless adapter 1756.

When used in a WAN networking environment, the computer 1702 can include a modem 1758, or is connected to a communications server on the WAN 1754, or has other means for establishing communications over the WAN 1754, such as by way of the Internet. The modem 1758, which can be internal or external and a wired or wireless device, is connected to the system bus 1708 via the serial port interface 1742. In a networked environment, program modules depicted relative to the computer 1702, or portions thereof, can be stored in the remote memory/storage device 1750. It will be appreciated that the network connections shown are example and other means of establishing a communications link between the computers can be used.

The computer 1702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 17 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 18:
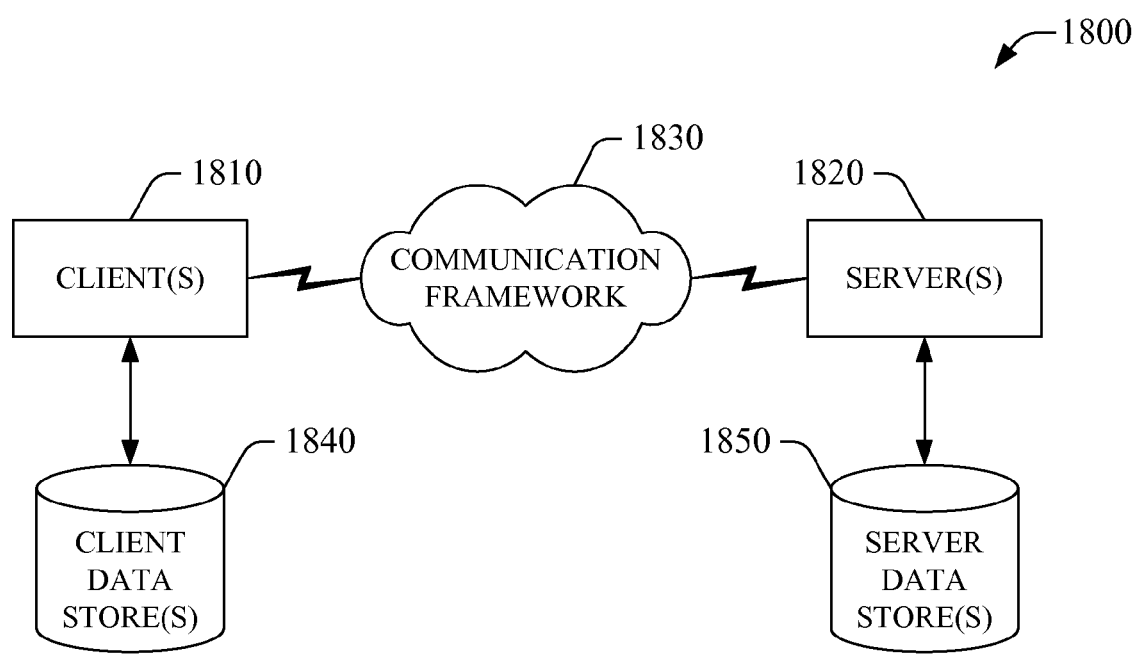
FIG. 18 illustrates a schematic block diagram of an example computing environment in accordance with aspects described herein.

FIG. 18 illustrates a schematic block diagram of an example computing environment 1830, in accordance with aspects described herein. The system 1800 includes one or more client(s) 1810. The client(s) 1810 can be hardware and/or software (e.g., threads, processes, computing devices). The system 1800 also includes one or more server(s) 1820. Thus, system 1800 can correspond to a two-tier client server model or a multi-tier model (e.g., client, middle tier server, data server), amongst other models. The server(s) 1820 can also be hardware and/or software (e.g., threads, processes, computing devices). The servers 1820 can house threads to perform transformations by employing the subject innovation, for example. One possible communication between a client 1810 and a server 1820 may be in the form of a data packet transmitted between two or more computer processes.

The system 1800 includes a communication framework 1830 that can be employed to facilitate communications between the client(s) 1810 and the server(s) 1820. The client(s) 1810 are operatively connected to one or more client data store(s) 1840 that can be employed to store information local to the client(s) 1810. Similarly, the server(s) 1820 are operatively connected to one or more server data store(s) 1850 that can be employed to store information local to the servers 1820.

It is to be noted that aspects, features, or advantages of the subject innovation described in the subject specification can be exploited in substantially any wireless communication technology. For instance, 4G technologies, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects of the subject innovation as disclosed in the subject specification can be exploited in legacy telecommunication technologies; e.g., GSM. In addition, mobile as well non-mobile networks (e.g., internet, data service network such as IPTV) can exploit aspect or features described herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
receiving, by a system comprising a processor, a communication request to initiate a call session with a user equipment, wherein the communication request includes a communication service identifier tag;
based at least in part on the communication service identifier tag, selecting a naming authority pointer resources record from a set of naming authority pointer resource records associated with the user equipment, wherein the naming authority pointer resources record includes information associated with a communication protocol supported by the user equipment; and
facilitating establishment of the call session based at least in part on the information included within the naming authority pointer resources record.

2. The method of claim 1, further comprising:
determining routing information to facilitate the establishment of the call session based at least in part on the naming authority pointer resources record.

3. The method of claim 2, wherein the determining includes identifying a service address associated with a protocol of an embedded service associated with the naming authority pointer resources record.

4. The method of claim 2, wherein the determining includes identifying a logical address associated with an access node based at least in part on service identification information specified within the communication service identifier tag.

5. The method of claim 1, further comprising:
monitoring a usage of a service identified by service identification information within the communication service identifier tag.

6. The method of claim 5, wherein the monitoring includes monitoring the usage of the service based at least in part on a pre-defined policy.

7. The method of claim 5, wherein the communication service identifier tag is a first communication service identifier tag and the method further comprises:
generating historical usage data based at least in part on the monitoring; and
based at least in part on the historical usage data, determining a set of remediation rules that facilitate modification of a second communication service identifier tag received in a subsequent communication request, in response to the second communication service identifier tag being syntactically incorrect.

8. The method of claim 1, wherein the selecting includes selecting the naming authority pointer resources record based at least in part on a mapping between a service specified within the communication service identifier tag and a service protocol associated with the naming authority pointer resources record.

9. The method of claim 1, further comprising:
identifying a plurality of service field attributes within the communication service identifier tag;
ranking the plurality of service field attributes; and
selecting a service field attribute of the plurality of service field attributes based at least in part on the ranking, wherein the selecting the naming authority pointer resources record includes selecting the naming authority pointer resources record based at least in part on the service field attribute.

10. A system, comprising:
a memory that stores computer-executable instructions; and
a processor, communicatively coupled to the memory, that facilitates execution of the computer-executable instructions to at least:
receive a request to initiate a call session with a user equipment, wherein the request includes tag data identifying a communication service,
identify a naming authority pointer resources record associated with the user equipment based at least in part on the tag data, wherein the naming authority pointer resources record includes information associated with a communication protocol supported by the user equipment, and
facilitate routing of the call session in accordance with the information included within the naming authority pointer resources record.

11. The system of claim 10, wherein the tag data includes a plurality of service field attributes that facilitate an identification of the naming authority pointer resources record.

12. The system of claim 11, wherein the processor further facilitates the execution of the computer-executable instructions to prioritize the plurality of service field attributes.

13. The system of claim 12, wherein the naming authority pointer resources record is identified based on a service field attribute of the plurality of service field attributes that satisfies a predefined priority criterion.

14. The system of claim 10, wherein the naming authority pointer resources record is identified based at least in part on an association between a service specified within tag data and a service protocol associated with the naming authority pointer resources record.

15. The system of claim 10, wherein the processor further facilitates the execution of the computer-executable instructions to determine historical usage data based at least in part on usage of a service specified within the tag data.

16. The system of claim 15, wherein the processor further facilitates the execution of the computer-executable instructions to update the tag data based at least in part on the historical usage data, in response to a determination that the tag data is syntactically incorrect.

17. A non-transitory computer readable storage medium comprising computer-executable instructions that, in response to execution, cause a system including a processor to perform operations, comprising:
receiving a request to initiate a call session with a user equipment, including receiving a telephone number associated with the user equipment and tag data identifying a communication service; and
converting the telephone number to an internet protocol-based domain name associated with the user equipment to facilitate establishment of the call session via at least two different communication services.

18. The non-transitory computer readable storage medium of claim 17, wherein the operations further comprise:
facilitating routing of the call session based at least in part on the internet protocol-based domain name and the tag data.

19. The non-transitory computer readable storage medium of claim 17, wherein the operations further comprise:
generating a telephone number mapping query based at least in part on the receiving.

20. The non-transitory computer readable storage medium of claim 19, wherein the operations further comprise:
facilitating a transmission of the telephone number mapping query to a network server; and
receiving, in response to the transmission, a set of naming authority pointer resource records related to the telephone number, wherein the set of naming authority pointer resources records indicate a set of respective communication protocols supported by the user equipment.

* * * * *

UNITED STATES PATENT AND TRADEMARK OFFICE
CERTIFICATE OF CORRECTION

PATENT NO. : 8,861,511 B2
APPLICATION NO. : 13/555716
DATED : October 14, 2014
INVENTOR(S) : Bernard Ku Page 1 of 1

It is certified that error appears in the above-identified patent and that said Letters Patent is hereby corrected as shown below:

On The Title Page,

In the Inventor at (75):

Delete "Barnard Ku"

Insert --Bernard Ku--

Signed and Sealed this
Thirtieth Day of December, 2014

Michelle K. Lee
*Deputy Director of the United States Patent and Trademark Office*